United States Patent
Suzuki et al.

(10) Patent No.: US 9,074,348 B2
(45) Date of Patent: Jul. 7, 2015

(54) LEARNING DIAGNOSTIC SYSTEM, STATE DIAGNOSTIC DEVICE, AND STATE LEARNING DEVICE FOR WORKING MACHINE

(75) Inventors: Hideaki Suzuki, Hitachi (JP); Yoshinori Furuno, Tsuchiura (JP); Kenji Araki, Mito (JP); Kozo Nakamura, Hitachiohta (JP); Shinya Yuda, Hitachi (JP); Hirotaka Takahashi, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 98 days.

(21) Appl. No.: 13/202,140
(22) PCT Filed: Feb. 19, 2010
(86) PCT No.: PCT/JP2010/052564
§ 371 (c)(1),
(2), (4) Date: Oct. 14, 2011
(87) PCT Pub. No.: WO2010/113561
PCT Pub. Date: Oct. 7, 2010

(65) Prior Publication Data
US 2012/0035802 A1    Feb. 9, 2012

(30) Foreign Application Priority Data
Mar. 31, 2009  (JP) ................ 2009-086708

(51) Int. Cl.
*E02F 9/22* (2006.01)
*E02F 9/26* (2006.01)
(Continued)

(52) U.S. Cl.
CPC . *E02F 9/26* (2013.01); *F02D 41/22* (2013.01); *G07C 5/008* (2013.01); *B60R 16/0315* (2013.01); *G07C 5/0808* (2013.01); *G07C 5/085* (2013.01); *G05B 23/0235* (2013.01)

(58) Field of Classification Search
CPC .... B60R 16/0315; F02D 41/22; G07C 5/008; G07C 5/0808; G07C 5/085; E02F 9/26; G05B 23/0235
USPC ........................................ 701/29.1
See application file for complete search history.

(56) References Cited

U.S. PATENT DOCUMENTS 6,202,014 B1 * 3/2001 Brandt et al. .................. 701/50
6,343,237 B1 * 1/2002 Rossow et al. ................ 700/83
(Continued)

FOREIGN PATENT DOCUMENTS

| JP | 07-168619 | 7/1995 |
| JP | 09-144613 | 6/1997 |

(Continued)

OTHER PUBLICATIONS

Notification of Transmittal of Translation of the International Preliminary Report on Patentability, International application No. PCT/JP2010/052564, International filing date Feb. 19, 2010.

*Primary Examiner* — James Trammell
*Assistant Examiner* — James E Stroud
(74) *Attorney, Agent, or Firm* — Baker Botts L.L.P.

(57) ABSTRACT

A learning diagnostic system for a working machine is capable of making a fault diagnosis of the working machine universally relative to various types of sensor information, and preventing a failure in the working machine by enabling a fault diagnosis even in a transient operating state that represents a transitional state between operating states.

A state learning device 201 sorts inputted sensor data 101a into one under a steady operating state and one under a transient operating state, and generates, through learning, steady state data 102a and intermediate state data 103a, each including a permissible error. A state diagnostic device 202 uses the steady state data 102a to determine whether an operating state of the working machine related to the inputted sensor data is the steady operating state or the transient operating state, and make a fault determination in the steady operating state. The state diagnostic device 202 also uses the intermediate state data 103a to make a fault determination in the determined transient operating state. The intermediate state data 103a also includes intermediate point information.

10 Claims, 18 Drawing Sheets

(51) Int. Cl.

| | | |
|---|---|---|
| *G05B 23/02* | (2006.01) | |
| *F02D 41/22* | (2006.01) | |
| *G07C 5/00* | (2006.01) | |
| *B60R 16/03* | (2006.01) | |
| *G07C 5/08* | (2006.01) | |

(56) References Cited

U.S. PATENT DOCUMENTS

| | | | |
|---|---|---|---|
| 6,493,616 B1 * | 12/2002 | Rossow et al. | 701/50 |
| 6,701,232 B2 * | 3/2004 | Yamaki | 701/33.8 |
| 6,868,325 B2 | 3/2005 | Menon et al. | |
| 7,287,188 B2 * | 10/2007 | Shibata et al. | 714/21 |
| 7,308,385 B2 * | 12/2007 | Wegerich et al. | 702/183 |
| 7,539,597 B2 * | 5/2009 | Wegerich et al. | 702/185 |
| 7,580,781 B2 * | 8/2009 | Mindeman | 701/33.8 |
| 7,945,427 B2 * | 5/2011 | Guenther et al. | 702/184 |
| 8,065,251 B2 * | 11/2011 | Mehta et al. | 706/45 |
| 8,126,628 B2 * | 2/2012 | Hershey et al. | 701/100 |
| 8,364,440 B2 * | 1/2013 | Putkonen | 702/182 |
| 8,600,672 B2 * | 12/2013 | Hidaka | 701/490 |
| 2003/0139908 A1 * | 7/2003 | Wegerich et al. | 702/183 |
| 2008/0071438 A1 * | 3/2008 | Nasr et al. | 701/22 |

FOREIGN PATENT DOCUMENTS

| | | |
|---|---|---|
| JP | 09-292918 | 11/1997 |
| JP | 09-305224 | 11/1997 |
| JP | 2000-266570 | 9/2000 |
| JP | 2002-276440 | 9/2002 |
| JP | 2005-025351 | 1/2005 |
| JP | 2005-201133 | 7/2005 |

* cited by examiner

FIG. 5

| | ENGINE SPEED | EXHAUST GAS TEMPERATURE | |
|---|---|---|---|
| (2) | (Rb, RL2) | (Tc, TL2) | ~501 |
| (3) | (Rb, RL3) | (Tb, TL3) | |
| (5) | (Ra, RL5) | (Td, TL5) | |
| (6) | (Ra, RL6) | (Ta, TL6) | |

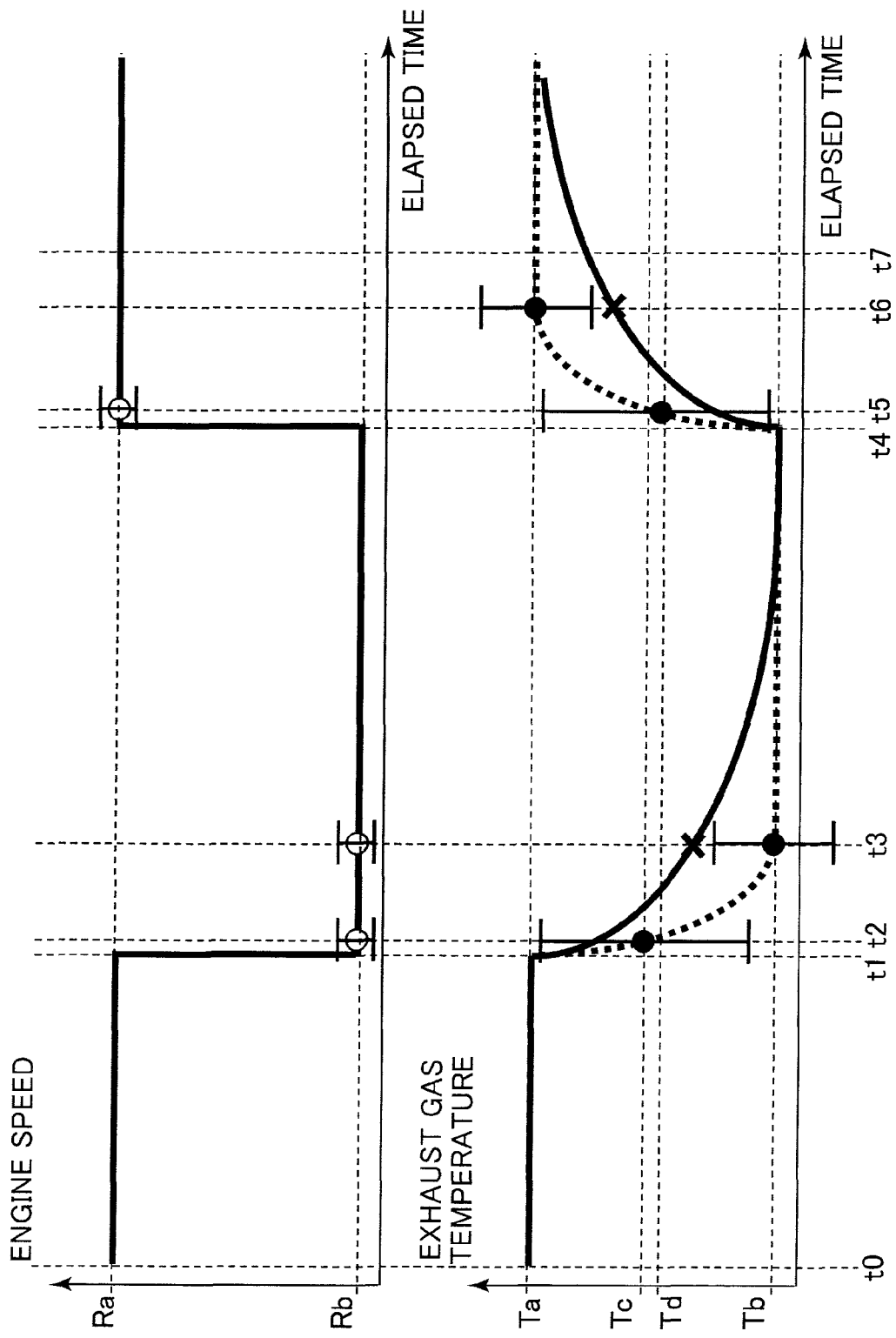

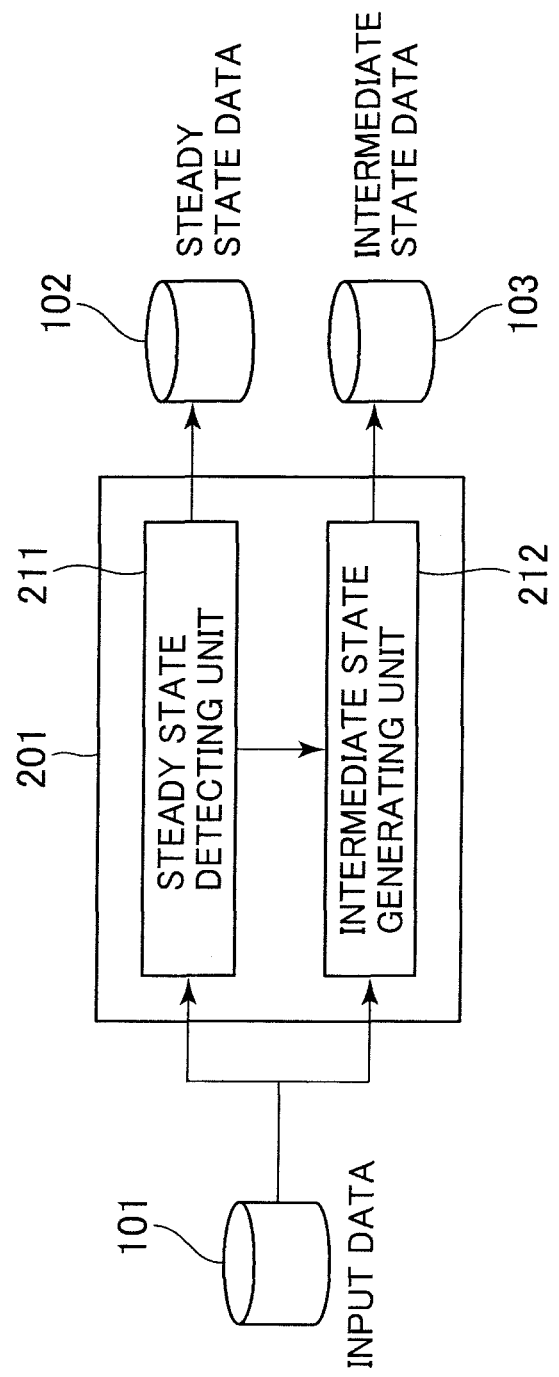

FIG. 11A

STEADY STATE DATA

| | ENGINE SPEED | EXHAUST GAS TEMPERATURE | |
|---|---|---|---|
| (3) | (Rb, RL3) | (Tb, TL3) | ~1301(102a) |
| (6) | (Ra, RL6) | (Ta, TL6) | |

FIG. 11B

INTERMEDIATE STATE DATA 1302(103a)

| | 1313 | 1311 | ENGINE SPEED | EXHAUST GAS TEMPERATURE | | 1312a | 1312b |
|---|---|---|---|---|---|---|---|
| (8) | (6,3) | (6,9) | Rb | Te | RL(6,3) | t(6,8) | t(8,9) |
| (9) | | (8,3) | Rb | Tf | | t(8,9) | t(9,3) |
| (10) | (3,6) | (3,11) | Ra | Tg | RL(3,6) | t(3,10) | t(10,11) |
| (11) | | (10,6) | Ra | Th | | t(10,11) | t(11,6) |

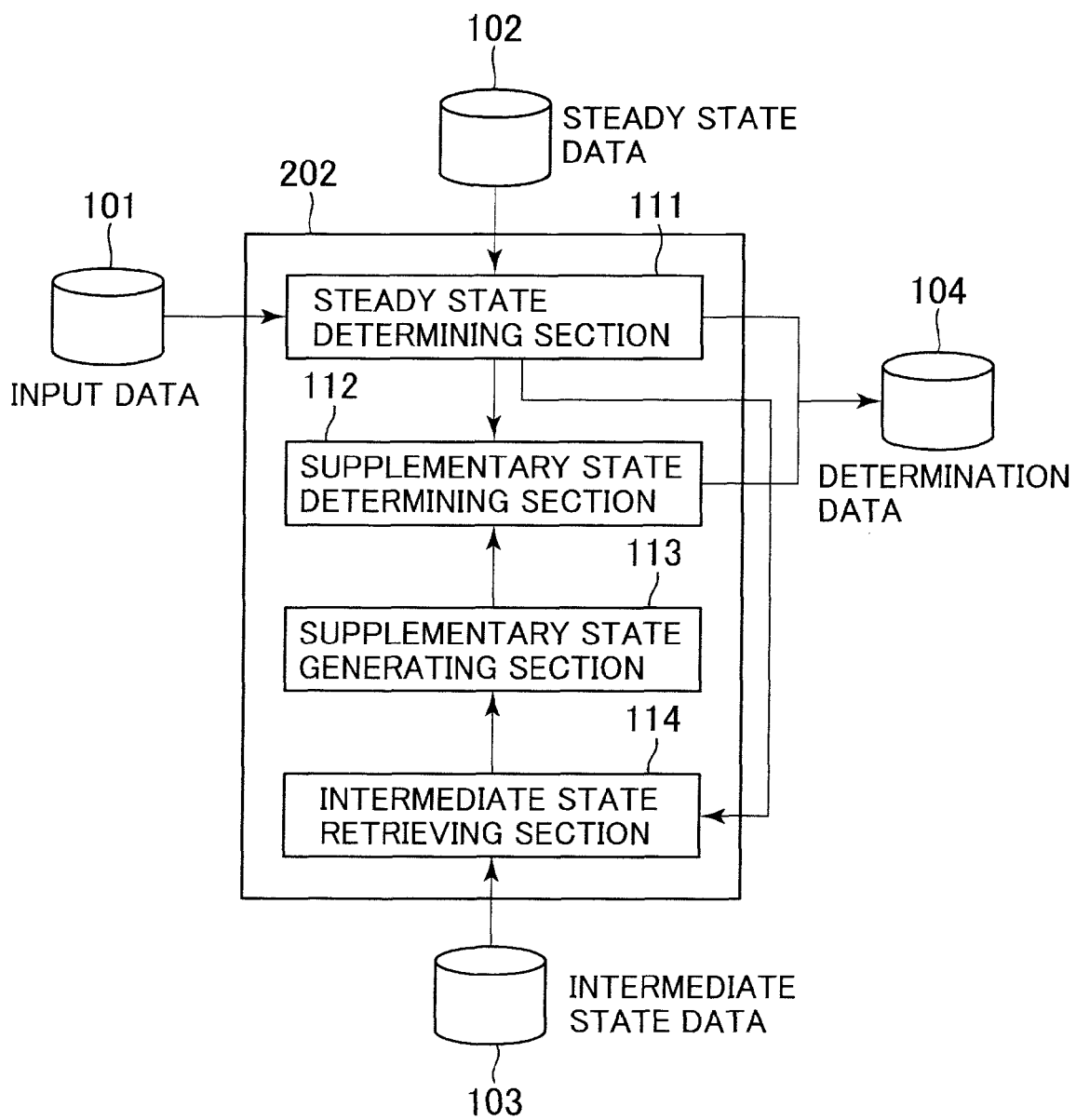

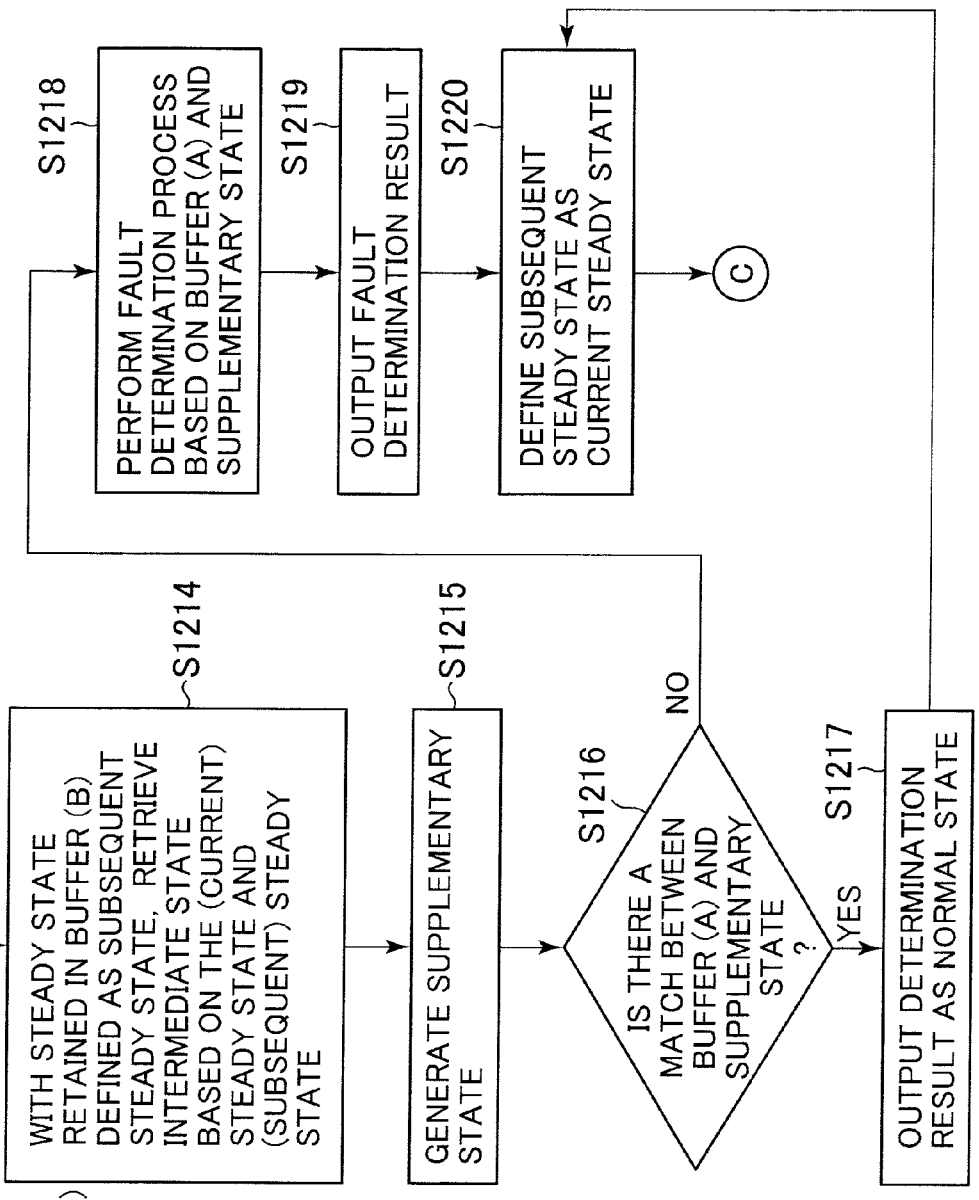

LEARNING DIAGNOSTIC SYSTEM, STATE DIAGNOSTIC DEVICE, AND STATE LEARNING DEVICE FOR WORKING MACHINE

TECHNICAL FIELD

The present invention relates to a learning diagnostic system, a state diagnostic device, and a state learning device for a working machine, which detect a fault in a hydraulic excavator or other working machine.

BACKGROUND ART

Some working machines, such as large-scale hydraulic excavators and other construction machines, operating in, for example, mines are required to operate 24 hours a day, 365 days a year, substantially without stopping. This makes it necessary to maintain the machine in best possible conditions through a preventive maintenance procedure before the machine is unusually stopped. In general, specialized service personnel perform an inspection through a periodic inspection service procedure to check for possible faulty spots; if a fault is identified, necessary service procedures are performed to maintain the machine in good operating conditions.

Meanwhile, to perform the inspection service procedure, the machine needs to be stopped. For an operator who wants to keep the machine running continuously, the inspection service procedure can be a hindrance to operation if the machine is kept in a good operating condition.

Fault diagnostic techniques have therefore been developed for monitoring operation to identify possible faults by measuring states of the machine using a various types of sensors. A fault diagnostic technique may be used to detect a fault before a machine stop occurs to thereby take preventive measures at early stages, so that a machine failure can be prevented from occurring.

Patent Documents 1 and 2, for example, disclose conventional fault diagnostic techniques. The fault diagnostic technique disclosed in Patent Document 1 derives and identifies a relationship between control command values and various sensor values as a static characteristic function and a boundary function which includes dynamic values, and determines a fault in actual operations using the static characteristic function and the boundary function. The fault diagnostic technique disclosed in Patent Document 2 creates a self-organized map by inputting a sensor value and a differential value thereof and, in actual operations, uses the self-organized map to recognize operation of a construction machine.

PRIOR ART REFERENCES

Patent Documents

Patent Document 1: JP-9-292918-A
Patent Document 2: JP-2005-25351-A

SUMMARY OF THE INVENTION

Problem to be Solved by the Invention

Although manufacturers have been making every effort to develop diagnostic algorithms for fault diagnostics, difficulty in developing ones has hampered appropriate determination. The difficulty in making an appropriate determination lies in a difference between an experimental environment in which the algorithm is developed and an operating environment or mode in which a user who uses the machine is placed.

In contrast, inventions have been made in which determination is made based on measurements taken in an actual environment. In Patent Document 1, the relationship between control command values and various sensor values is determined using the static characteristic function and the boundary function. Patent Document 1, however, gives only one example of showing the static characteristic function or the boundary function, and does not show what types of functions to use for various types of actuators and sensors. It is unknown whether the technique is applicable to various operating modes.

Patent Document 2 discloses a technique that identifies an operating state based on a self-organized map created by inputting a sensor value and a differential value thereof. Though describing identification of each operating state, Patent Document 2 does not disclose diagnostics during transition between operating states (transient operating state).

The present invention has been made in view of the foregoing problems and it is an object of the present invention to provide a learning diagnostic system, a state learning device, and a state diagnostic device for a working machine, which are capable of making a fault diagnosis of the working machine universally relative to various types of sensor information, and preventing a failure in the working machine by enabling a fault diagnosis even in a transient operating state that represents a transitional state between operating states.

Means for Solving the Problem

To achieve the foregoing object, the present invention provides a learning diagnostic system for a working machine that includes a machine body mounted with working implement, the learning diagnostic system detecting a state quantity (e.g., an engine speed and an exhaust gas temperature) of the working machine with a sensor and inputting the data as running data to thereby detect a fault in an operating state of the working machine using the running data. The learning diagnostic system includes: a state learning device for sorting the inputted running data into running data when the operating state of the working machine is a steady operating state and running data when the operating state of the working machine is a transient operating state, learning the operating state of the working machine based on the sorted running data, and generating steady state information and transient state information, each including a permissible error; and a state diagnostic device for determining, using the inputted running data and the steady state information including the permissible error and generated in the state learning device, whether the operating state of the working machine related to the inputted running data is the steady operating state or the transient operating state, making a fault determination in the steady operating state, and using the transient state information including the permissible error generated in the state learning device to make a fault determination in the determined transient operating state.

As such, performing a diagnosis using the steady state information and the transient state information, each including the permissible error, generated in the state learning device, the state diagnostic device can perform a fault diagnosis of the working machine universally for a variety of types of sensor information.

The state learning device sorts the running data into that when the working machine is in the steady operating state and that when the working machine is in the transient operating state to thereby generate the steady state information and the transient state information. The state diagnostic device makes a fault determination by identifying the steady operating state and the transient operating state. Therefore, the state diagnostic device is capable of performing a fault diagnosis in the transient operating state which represents a transitional state between operating states as well as in the steady operating state, thereby preventing the working machine from failing.

Preferably, the state learning device selects, of the running data when the operating state is the transient operating state, running data in an interval continuous with respect to time; selects, of the running data when the operating state is the steady operating state, running data in two steady operating states before and after transition to the transient operating state in which the running data is selected; and generates the transient state information based on the running data selected in the two steady operating states and the running data selected in the transient operating state; and the state diagnostic device searches through the transient state information generated in the state learning device based on the two steady operating states before and after the transition to the determined transient operating state to thereby extract corresponding transient state information; and makes a fault determination in the determined transient operating state based on the determined transient operating state and the extracted transient state information.

The state diagnostic device makes a fault determination based on the transient state information corresponding to the running data in the transient operating state at a specific point in time, which permits appropriate diagnosis even in the transient operating state.

Preferably, the state learning device calculates, based on the running data selected in the two steady operating states and the running data selected in the transient operating state, intermediate point information that approximates the running data selected in the transient operating state with plurality of straight lines, and generates the intermediate point information and the transient state information including the permissible error. The state diagnostic device generates, in the determined transient operating state, supplementary data based on the intermediate point information generated in the state learning device, and makes a fault determination using the supplementary data and the permissible error.

The state diagnostic device makes the fault determination by generating the supplementary data using the intermediate point information and the transient state information that includes the permissible error. This minimizes a volume of the transient state information to be learned. At the same time, a highly accurate diagnosis can be made using a small amount of data. In addition, learning and diagnosis can be made without requiring advance knowledge of the transient state.

Preferably, the state learning device inputs, as the running data, a combination of plural correlated running data items, and generates the steady state information and the transient state information using the plural correlated running data items. The state diagnostic device inputs, as the running data, the same combination of the plural correlated running data items as that inputted by the state learning device, and makes a fault determination of the plural correlated running data items.

A fault determination can therefore be made. In addition, a symptom of a fault can be predicted from a change in a relationship of running data and a cause of a fault can be estimated.

Effects of the Invention

The present invention allows a fault diagnosis of the working machine to be made universally for a variety of types of sensor information. In addition, the present invention permits a fault diagnosis under the transient operating state that represents a transitional state between operating states as well as under the steady operating state, thereby preventing the working machine from failing.

The fault determination is made based on the transient state information corresponding to the running data in the transient operating state at a specific point in time, which permits appropriate diagnosis even in the transient operating state.

Additionally, the intermediate point information and the transient state information including the permissible error are generated to thereby generate the supplementary data, with which the fault determination is made. This minimizes the volume of the transient state information to be learned. At the same time, a highly accurate diagnosis can be made using the small amount of data.

Furthermore, the state diagnostic device makes a diagnosis by inputting a combination of the plural correlated running data items. This not only permits the fault determination, but also allows a symptom of a fault to be estimated from a change in a relationship of running data and a cause of a fault to be estimated.

BRIEF DESCRIPTION OF THE DRAWINGS

FIG. 5 is a diagram showing an example of state data generated during learning according to a diagnostic method based on a basic concept of the present invention.

FIG. 7 is a diagram showing a relationship between changes in the engine speed and the exhaust gas temperature and the intermediate state data during diagnosis according to the diagnostic method based on the basic concept of the present invention.

FIG. 8 is a diagram showing a configuration of a state learning device.

FIG. 11A is a diagram showing an example of the steady state data generated by the state learning device.

FIG. 11B is a diagram showing an example of the intermediate state data generated by the state learning device.

FIG. 12 is a diagram showing a configuration of a state diagnostic device.

FIG. 13C is a flow chart showing processing functions of the state diagnostic device.

MODES FOR CARRYING OUT THE INVENTION

An embodiment of the present invention will be described below with reference to the accompanying drawings.

Figure 1:
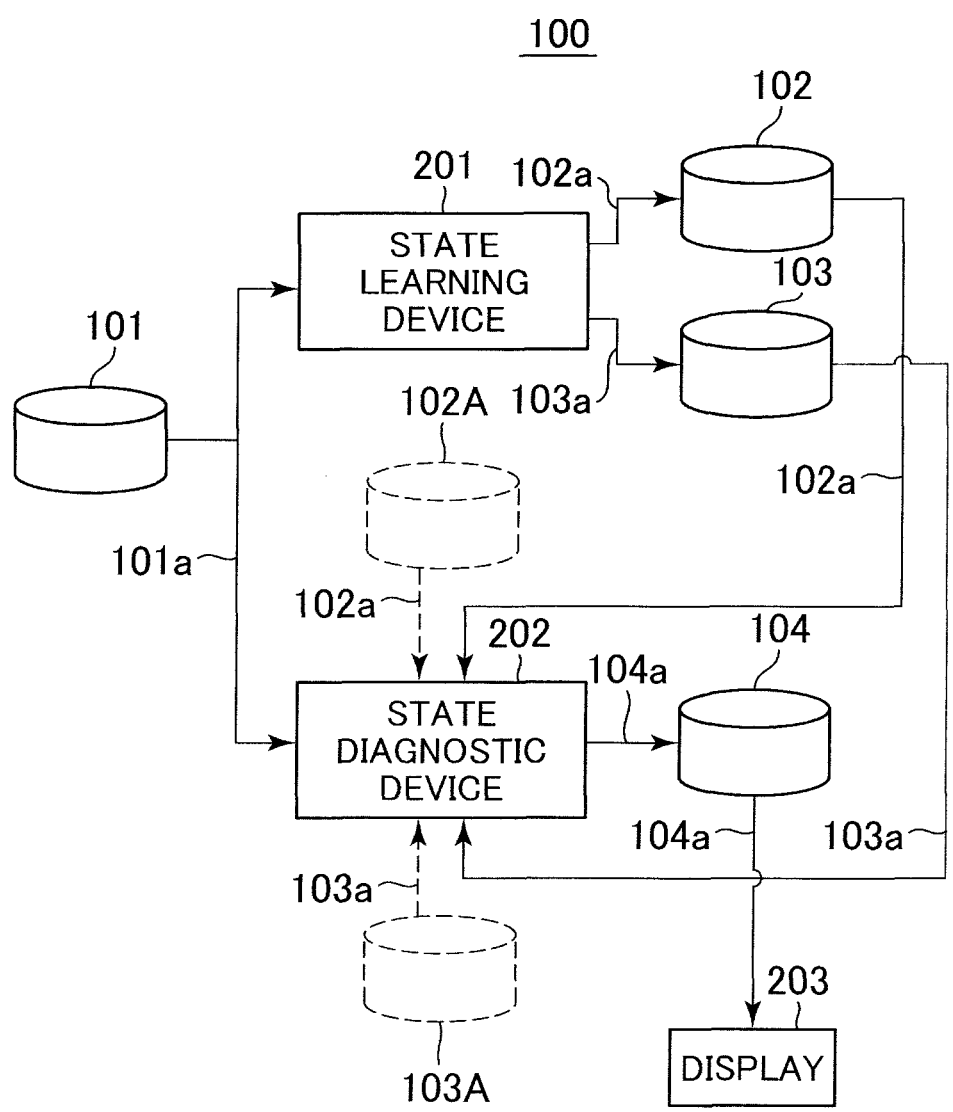
FIG. 1 is a diagram showing a general configuration of a learning diagnostic system for a working machine according to an embodiment of the present invention.

FIG. 1 is a diagram showing a general configuration of a learning diagnostic system for a working machine according to an embodiment of the present invention. Referring to FIG. 1, a learning diagnostic system 100 includes an input database 101, a state learning device 201, a steady state database 102, a transient state database 103, a state diagnostic device 202, a determination result database 104, and a display 203.

The input database 101 stores sensor data 101a (running data) that includes, for example, sensor information gathered from various types of sensors mounted on a machine to be diagnosed. The sensor data 101a may include processed sensor information. The sensor data 101a also includes time-of-day information. The sensor data 101a stored in the input database 101 is inputted to the state learning device 201 and the state diagnostic device 202.

The state learning device 201 inputs a combination of correlated sensor data as the sensor data to be inputted from the input database 101. Based on the sensor data, the state learning device 201 determines whether the working machine is in a steady operating state or a transient operating state and generates steady state data 102a that is steady state information and intermediate state data 103a that is transient state information, each including a median (mean) and an error (permissible error) for each of the steady operating state and the transient operating state.

The steady state data 102a generated by the state learning device 201 is stored in the steady state database 102 and the intermediate state data 103a generated by the state learning device 201 is stored in the transient state database 103.

Similarly to the state learning device 201, the state diagnostic device 202 also inputs, as the sensor data to be inputted from the input database 101, the same combination of the correlated sensor data as that inputted by the state learning device 201, and based on the sensor data, determines whether the working machine is in the steady operating state or the transient operating state. If the working machine is in the steady operating state, the state diagnostic device 202 makes a fault determination using the steady state data 102a generated by the state learning device 201; if the working machine is in the transient operating state, the state diagnostic device 202 makes a fault determination using the intermediate state data 103a generated by the state learning device 201.

Determination result data 104a obtained by the state diagnostic device 202 is stored in the determination result database 104. The display 203 includes any human input devices, such as a keyboard and a mouse. Operating these operating devices allows the determination result data 104a to be displayed via the determination result database 104.

The state learning device 201 and the state diagnostic device 202 may perform learning and a diagnosis simultaneously. Preferably, however, the state learning device 201 first performs learning to generate diagnostic data and then the state diagnostic device 202 performs a diagnosis using the diagnostic data. In that case, the state diagnostic device 202 may perform the diagnosis by directly using the data 102a, 103a generated by the state learning device 201 and stored in the databases 102, 103; alternatively, databases 102A, 103A dedicated to diagnosis may be separately prepared and the data 102a, 103a stored in the databases 102, 103 are downloaded in the databases 102A, 103A for use in the diagnosis. In this case, the state learning device 201 and the state diagnostic device 202 are systems independent of each other.

To achieve reliability in the diagnostic data (the steady state data 102a and the intermediate state data 103a) generated by the state learning device 201 through learning, the sensor data 101a used for the learning represents data when the working machine is in a normal operating state. Accordingly, the state learning device 201 treats the inputted sensor data as that during the normal operating state based on an assurance of, for example, a maintenance record that testifies that the working machine does not develop any failure during a period of time during which the sensor data for learning is being inputted.

Figure 2:
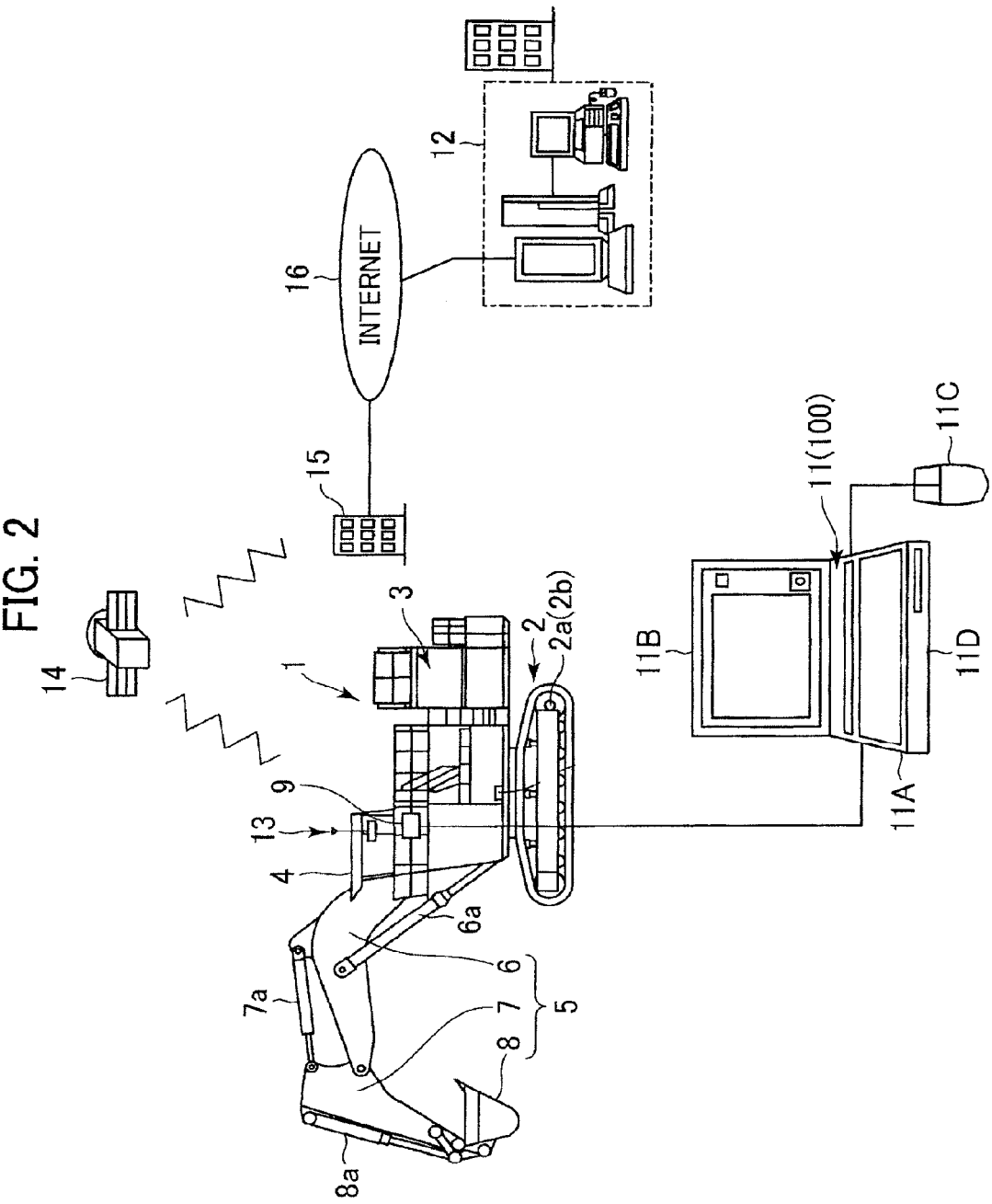
FIG. 2 is an illustration showing a general structure of a large-scale hydraulic excavator as an example of the working machine to which the diagnostic system of the present invention is applied, and the diagnostic system.

FIG. 2 is an illustration showing a general structure of a large-scale hydraulic excavator as an example of the working machine to which the diagnostic system of the present invention is applied, and the diagnostic system.

Referring to FIG. 2, a hydraulic excavator 1 is an ultra-large scale excavator (backhoe type), of a class of several hundred tons of machine weight, used very often in, for example, mines in many countries. The hydraulic excavator 1 includes a track structure 2, a swing structure (machine body) 3, a cab 4, and a front working implement 5. Specifically, the swing structure (machine body) 3 is disposed revolvably on the track structure 2. The cab 4 is disposed on the left side in a front portion of the swing structure 3. The front working implement 5 is attached at a center of the front portion of the swing structure 3 so as to be raised and lowered. The front working implement 5 includes a boom 6, an arm 7, and a bucket 8. Specifically, the boom 6 is rotatably attached to the swing structure 3. The arm 7 is rotatably attached to a leading end of the boom 6. The bucket 8 is rotatably attached to a leading end of the arm 7. The swing structure 3 is mounted with, for example, two engines and plurality of main pumps (not shown) driven by the engines. The track structure 2 travels forward or backward as left and right track motors 2a, 2b drive left and right crawlers, respectively. The swing structure 3 is rotatably driven relative to the track structure 2 by a revolving motor (not shown). The boom 6, the arm 7, and the bucket 8 are driven by a boom cylinder 6a, an arm cylinder 7a, and a bucket cylinder 8a, respectively. A data recording unit 9 having a function as the input database 101 is disposed in the cab 4. A detection signal from each sensor (detecting means) is inputted to the data recording unit 9 at predetermined time intervals and the information is stored in memory as the sensor data 101a. A personal computer 11 including the learning diagnostic system 100 according to the embodiment of the present invention (either the state learning device 201 or the state diagnostic device 202, if each of these two is configured as a system independent of each other) can be connected via a cable to the data recording unit 9 (input database 101). Connecting the personal computer 11 to the data recording unit 9 allows the sensor data 101a stored in the data recording unit 9 to be downloaded in the personal computer 11. The personal computer 11 includes a personal computer main unit 11A, a display 11B as display means, and a mouse 11C and a keyboard 11D as input means.

The learning diagnostic system 100 according to the embodiment of the present invention (each of the state learning device 201 and the state diagnostic device 202, if each of these two is configured as a system independent of each other) may be disposed in a server 12 installed in an administrative office (for example, an office of a manufacturer, a sales outlet, a dealer, or a rental company of the hydraulic excavator 1) of the hydraulic excavator 1. In this case, the data recording unit 9 includes a wireless device 13. The sensor data 101a recorded in the data recording unit 9 is regularly transmitted to the server 12 via the wireless device 13, a communications satellite 14, a base station 15, and an internet 16. If the administrative office is located relatively closely to a work site, a service technician may download the sensor data 101a by connecting a memory card or other portable recording medium to the data recording unit 9, bring the recording medium back to the administrative office, and download the sensor data 101a from the recording medium to the server.

Figure 3:
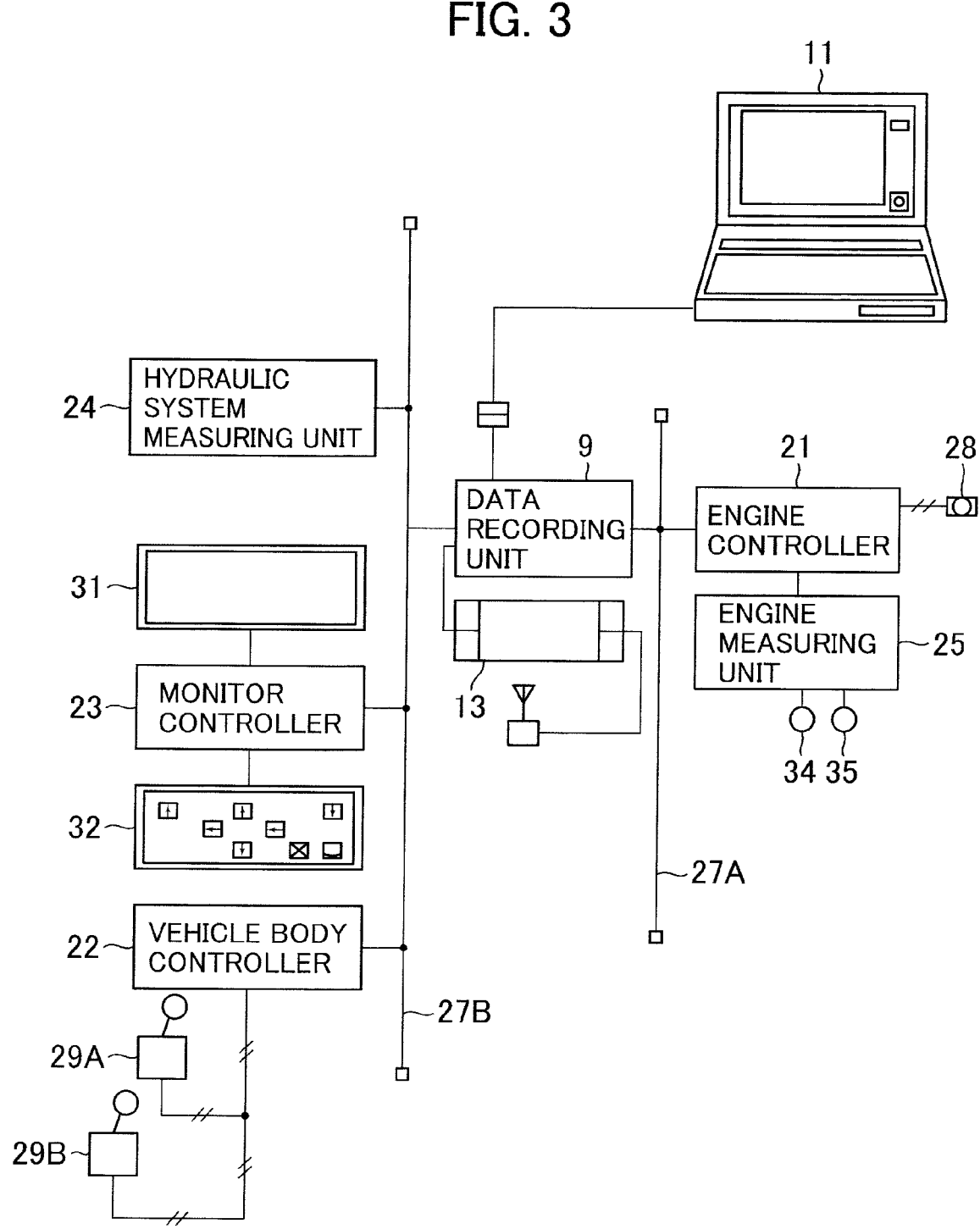
FIG. 3 is a diagram showing a controller network installed in a cab 4 of a hydraulic excavator 1.

FIG. 3 is a diagram showing a controller network installed in the cab 4 of the hydraulic excavator 1. The controller network of the hydraulic excavator 1 includes an engine controller 21, a vehicle body controller 22, a monitor controller 23, a hydraulic system measuring unit 24, an engine measuring unit 25, and the data recording unit 9 (input database 101). The engine measuring unit 25 is connected to the engine controller 21. The engine controller 21 is connected to the data recording unit 9 via a first common communication line 27A. The vehicle body controller 22, the monitor controller 23, and the hydraulic system measuring unit 24 are connected to the data recording unit 9 via a second common communication line 27B.

The engine controller 21 controls an electronic governor 28 to thereby vary a fuel injection amount of the engine. The vehicle body controller 22 receives inputs of operating signals (electric signals) of electric lever devices 29A, 29B and controls solenoid valves (not shown) according to the operating signals, thereby controlling a hydraulic system. The monitor controller 23 is connected to a display 31 and an operating section 32 and performs control relating to display of the display 31 according to input operations performed through the operating section 32. The hydraulic system measuring unit 24 collects detection signals representing various types of state quantities of devices, such as a main pump, relating to the hydraulic system. The engine measuring unit 25 collects detection signals representing various types of state quantities, such as an engine speed, an exhaust gas temperature, and a radiator coolant temperature, of devices relating to an engine system. In FIG. 3, a speed sensor 34 for detecting the engine speed and a temperature sensor 35 for detecting the exhaust gas temperature are shown as examples of sensors that detect the state quantities.

The data recording unit 9 receives at predetermined intervals, via the first and second common communication lines 27A, 27B, inputs of required data as selected from among the state quantity data collected by the hydraulic system measuring unit 24 and the engine measuring unit 25, and input data and output data at the engine controller 21, the vehicle body controller 22, and the monitor controller 23. The data recording unit 9 then stores the data as the sensor data 101a. As described earlier, the personal computer 11 (the learning diagnostic system 100) can be connected to the data recording unit 9, so that the sensor data 101a stored in the data recording unit 9 can be downloaded to the personal computer 11. In addition, the sensor data 101a stored in the data recording unit 9 is transmitted at regular intervals to the server 12 (learning diagnostic system 100) at the administrative office via the wireless device 13. The monitor controller 23 may be adapted to have a function of the learning diagnostic system 100, in which case the sensor data 101a stored in the data recording unit 9 is transmitted at regular intervals to the monitor controller 23 via the second common communication line 27B.

Figure 4:
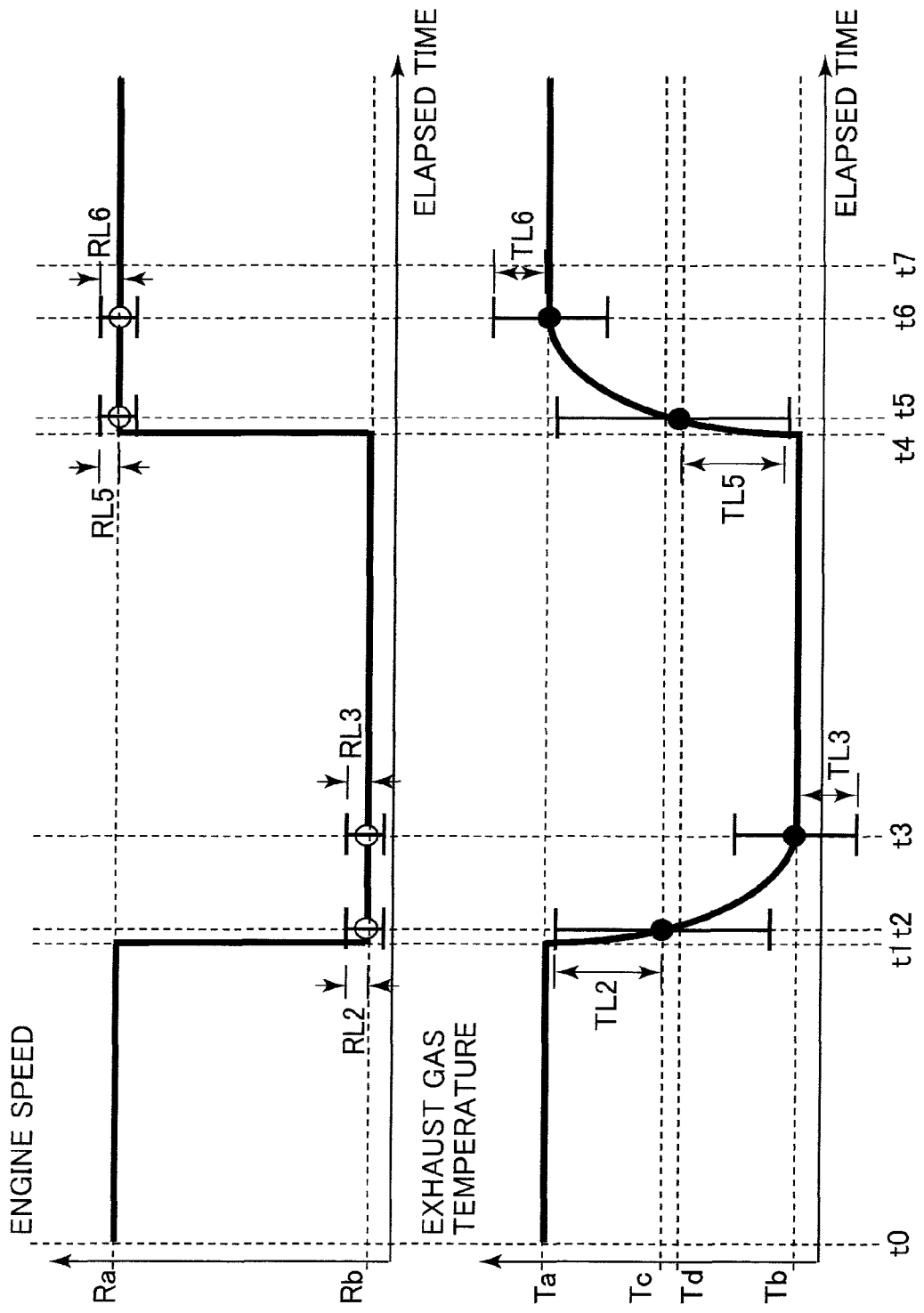
FIG. 4 is a diagram showing changes in an engine speed and an exhaust gas temperature corresponding thereto, as an example of a combination of correlated sensor data (running data).

FIG. 4 is a diagram showing changes (changes with respect to time) in an engine speed and an exhaust gas temperature corresponding thereto, as an example of a combination of plurality of correlated sensor data 101a (running data) items. When the engine is in a high rpm state Ra, the exhaust gas temperature is also in a high temperature state Ta. When the engine is in a low rpm state Rb, the exhaust gas temperature is also in a relatively low temperature state Tb. Note, however, that a change in temperature of the engine is mild relative to the change in the engine speed (specifically, the engine does not quickly cool down even when it runs at low speeds), so that the exhaust gas temperature changes at a mild pace.

When the working machine is in a normal operating state, a relationship among the plurality of correlated sensor data 101a items remains substantially constant. A change in the relationship among the plurality of correlated sensor data 101a items can be regarded as a symptom of a fault. In addition, examination of the change in the relationship among the plurality of correlated sensor data 101a items allows a cause of the fault to be estimated. For example, in the example of the change in the exhaust gas temperature relative to the change in the engine speed shown in FIG. 4, if the exhaust gas temperature changes relative to the change in the engine speed in a mode different from that shown in FIG. 4, it can be estimated that a fault of some sort may occur in the engine.

Methods as shown below are possible for diagnosing whether a change in the engine speed or the exhaust gas temperature is indicative of a normal operating state.

A first method is to perform a diagnosis in only an interval having no changes. In the example, this method determines whether a normal value is achieved under each of conditions, for example, in intervals (hereinafter referred to as steady intervals) from t0 to t1, from t3 to t4, and from t6 to t7, in which the engine speed remains constant and stable and the exhaust gas temperature remains constant and stable. This method is not, however, able to perform diagnosis in intervals (hereinafter referred to as transitional intervals) in which the state changes, such as those from t1 to t3 and from t4 to t6.

In contrast, a second method recognizes the state and performs the diagnosis by adding the change itself, specifically, a variation of each sensor data item (that is, the engine speed and the exhaust gas temperature in this context) to the condition. As is known from FIG. 4, however, the exhaust gas temperature changes nonlinearly from t1 to t3, so that a variation value itself changes variedly. Specifically, the method that simultaneously uses the sensor value and the variation value thereof offers poor diagnostic accuracy, if the state changes nonlinearly.

In contrast, a method is also possible that improves diagnostic accuracy by using a static function in the steady interval and a dynamic function in the transitional interval. The terms "static" and "dynamic" as used herein refer to whether a value remains constant relative to a change in time or a value of a function with respect to time changes relative to a change in time. Use of this method permits accurate diagnosis in the steady interval and the transitional interval. This, however, requires that specific static and dynamic functions be designed to be applicable to each of the various types of machine sensor data, involving a tremendous amount of design work for combinations of a large number of sensor data items.

In the example shown in FIG. 4 representing a basic concept of the present invention, an approach is taken for the foregoing methods to save time and effort in the design by setting a combination and a permissible error of sensor data items. This approach assumes that all operating states are in the steady state and retains the combination and the permissible error of the sensor data items as state data 501 as shown in FIG. 5. To the interval from t6 to t7 in FIG. 4, for example, (6) of the state data 501 is applied. The engine speed falls within a range of a permissible error RL6 relative to Ra. In the interval from t6 to t7, the exhaust gas temperature corresponding to the engine speed falls within a range of a permissible error TL6 relative to Ta. It is therefore determined that the operating state is normal. Similarly, (5) of the state data 501 is applied to the transitional interval from t4 to t6 in FIG. 4. As with the case of (6) above, the engine speed falls within a range of a permissible error RL5 relative to Ra. The exhaust gas temperature falls within a range of a permissible error TL5 relative to Td. It is therefore determined that the operating state is normal.

Figure 6:
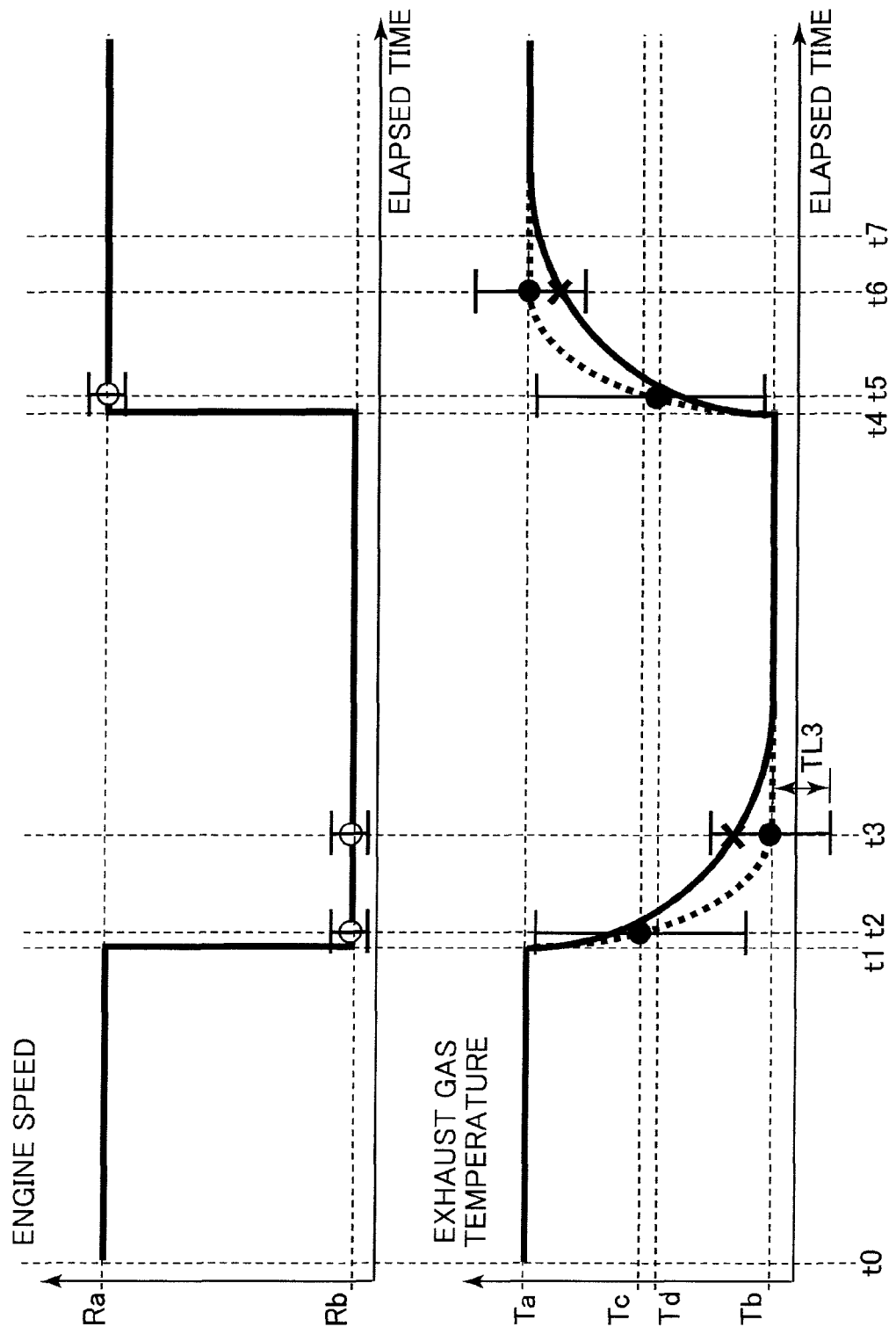
FIG. 6 is a diagram showing a relationship between changes in the engine speed and the exhaust gas temperature and intermediate state data during diagnosis according to the diagnostic method based on the basic concept of the present invention.

There is, however, room for further improvement in this technique. Specifically, at a point in time of t3, for example, in a condition in which deterioration in the engine is advanced as shown in FIG. 6, a deteriorated state to be originally detected (a state in which the exhaust gas temperature decreases at a slow pace) is determined to be normal because of a large permissible error TL3 involved. If the exhaust gas temperature falls outside the range of the permissible error TL3 as shown in FIG. 7, the operating state is determined to be faulty; however, the state as shown in FIG. 7 develops after the deterioration is advanced to a fair degree. As a result, the assumption of the algorithm that all operating states are in the steady state poses a problem in that diagnostic accuracy is deteriorated in the transitional state.

This embodiment can circumvent aggravation of the diagnostic accuracy in the transitional state as described above, while keeping an advantage of being universally applicable to combinations of various types of sensor data.

The state learning device 201 and the state diagnostic device 202 in this embodiment will be described in detail below.

First, referring to FIGS. 8, 9A, 9B, 10, 11A, and 11B, generation of the steady state data 102*a* and the intermediate state data 103*a* in the state learning device 201 will be described.

Figure 9A:
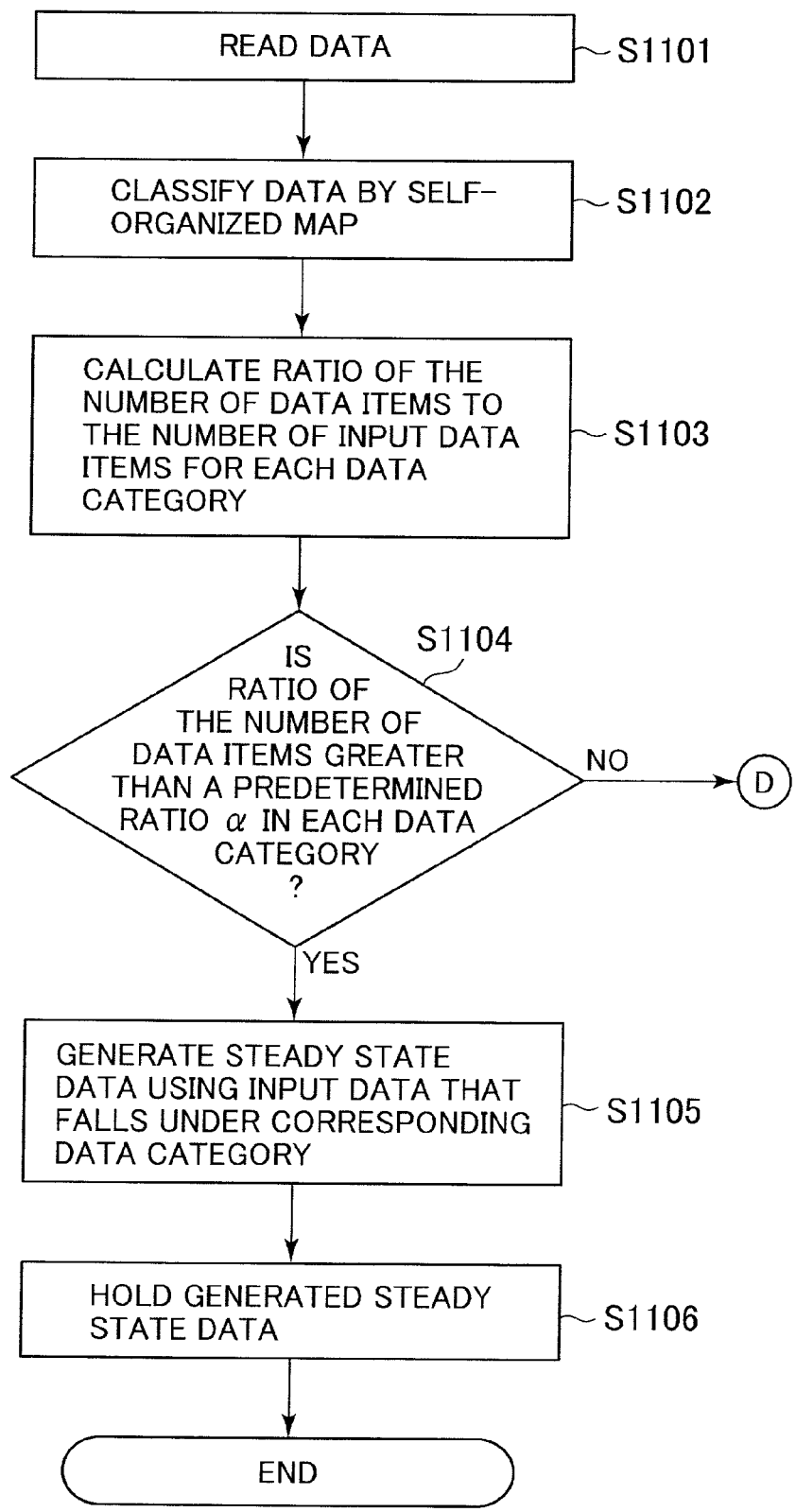
FIG. 9A is a flow chart showing processing functions of the state learning device.
Figure 9B:
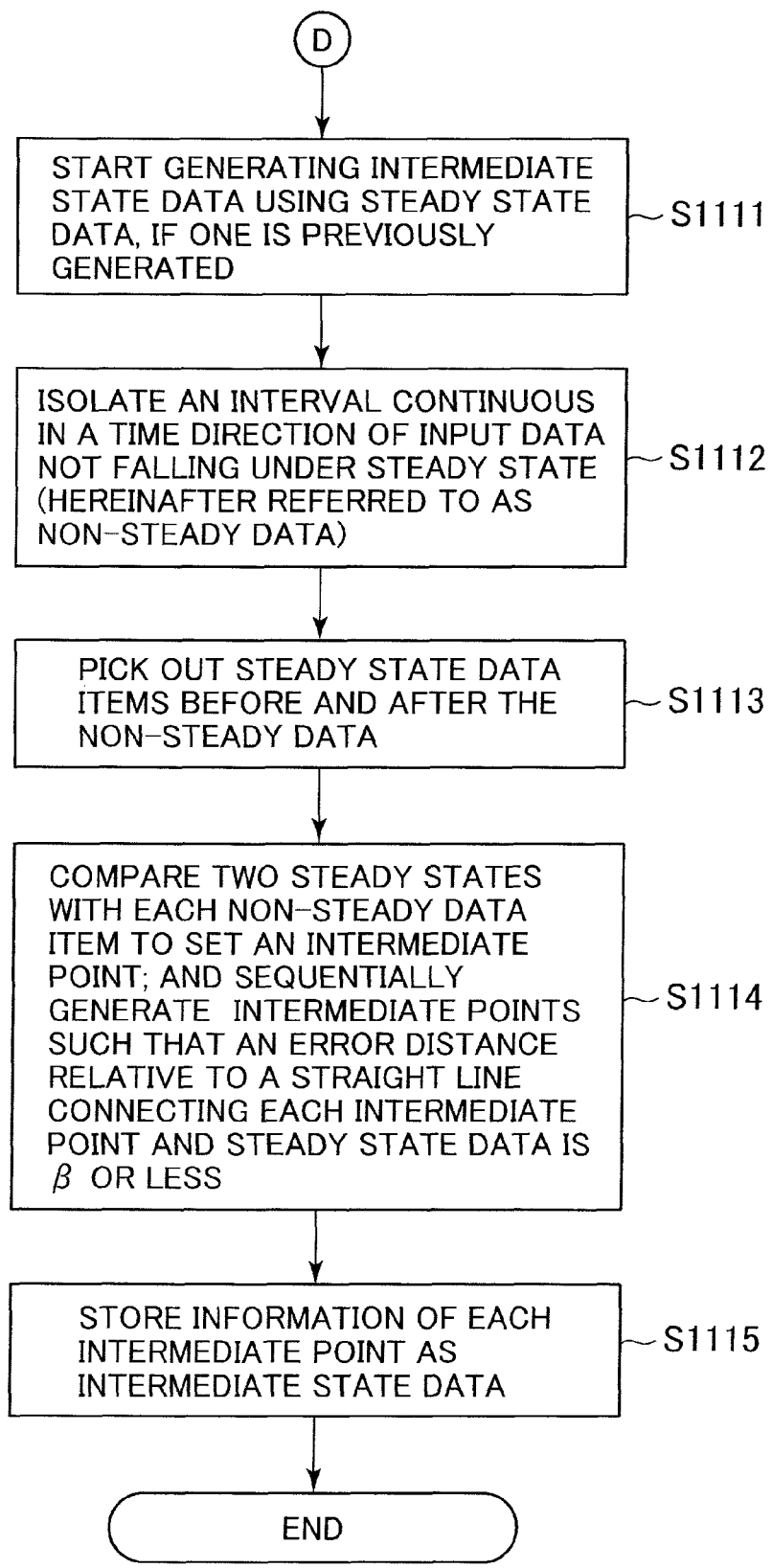
FIG. 9B is a flow chart showing processing functions of the state learning device.
Figure 10:
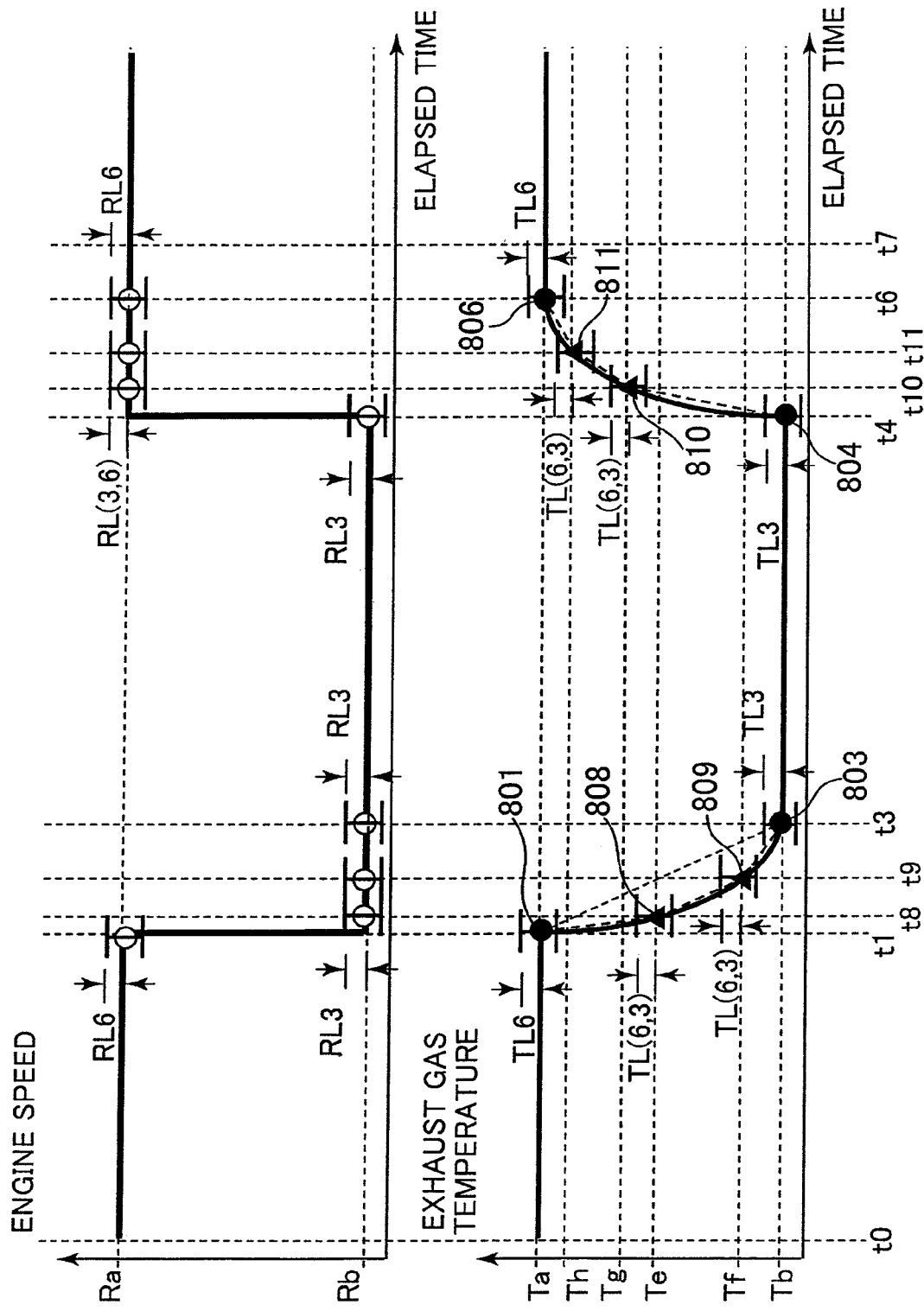
FIG. 10 is a diagram showing a relationship between changes in the engine speed and the exhaust gas temperature, and steady state data and the intermediate state data.

FIG. 8 is a diagram showing a configuration of the state learning device 201. FIGS. 9A and 9B are flow charts showing processing functions of the state learning device 201. FIG. 10 is a diagram showing a relationship between changes in the engine speed and the exhaust gas temperature, and steady state data and the intermediate state data. FIGS. 11A and 11B are diagrams showing examples of the steady state data 102*a* and the intermediate state data 103*a* generated by the state learning device 201.

The state learning device 201 includes a steady state detecting unit 211 and an intermediate state generating unit 212. The steady state detecting unit 211 sorts the sensor data 101*a* (hereinafter referred appropriately to as "input data") inputted from the input database 101, generates the steady state data 102*a* shown in FIG. 11A, and stores the data in the steady state database 102 (steps S1101 to S1106). For sorting of the sensor data in the steady state detecting unit 211, an algorithm, such as a self-organized map (SOM) which is one of "sorting algorithms without teacher", may be used. The self-organized map is a technique for sorting the input data into plurality of data groups. The self-organized map itself serves only as a technique for simply sorting given input data into plurality of data groups and is not able to determine a steady state. The steady state detecting unit 211 determines whether each data group is in a steady state according as how much input data falls under each of the data groups sorted by the self-organized map. For example, if the number of input data samples is N, it is determined whether a ratio of the data samples in each data group is greater than a predetermined ratio α. If the ratio is greater than the predetermined ratio α (the number of data samples in each data group is greater than αN), it can then be defined that only that particular data group is the data group representing the steady state (steps S1103 to S1105). This is based on an assumption that the number of samples falling under the steady state is more than a predetermined number and the number of samples falling under the transient state is small. In addition to the SOM, other "sorting algorithms without teacher" include "K-means" and "EM algorithm" and they can be used for sorting the sensor data in the steady state detecting unit 211.

FIG. 11A is a diagram showing an example of the steady state data 102*a* generated by the steady state detecting unit 211. In FIG. 11A, the steady state data is identified by reference numeral 1301 to mean that the data is specific.

Samples sorted into the steady state fall under intervals from time t0 to t1, from t3 to t4, and from t6 to t7, in FIG. 10. The intervals from t0 to t1 and from t6 to t7 correspond to the left column of (6) of the steady state data 1301 shown in FIG. 11A and the interval from t3 to t4 corresponds to the left column of (3) of the steady state data 1301. (6) is associated with t6. Further, a relationship of t6=t0 holds. (3) is associated with t3. Specifically, (6) and (3) indicate that data samples under those items represent the steady state data at time t0 and t3. Additionally, (6) and (3) have a role of index information used for searching through the steady state data 102*a* and extracting the steady state data 1301. The median and the permissible error of the steady state data 1301 are generated based on input data samples sorted into each data group and can be obtained by calculating the median (mean) of the input data samples falling under each data group and the error of each input data sample relative to the median. In the engine speed column of FIG. 11A, Rb and Ra are medians and used as reference values for the steady state during the diagnosis in the state diagnostic device 202. RL3 and RL6 are errors and used as permissible errors of the steady state during the diagnosis in the state diagnostic device 202. In the exhaust gas temperature column of FIG. 11A, Tb and Ta are medians and used as reference values for the steady state during the diagnosis in the state diagnostic device 202. TL3 and TL6 are errors and used as permissible errors of the steady state during the diagnosis in the state diagnostic device 202.

Generation of the intermediate state data in the intermediate state generating unit 212 of the state learning device 201 will be described below. After the steady state data 102*a* is generated by the steady state detecting unit 211, the intermediate state generating unit 212 refers to the steady state data to thereby generate the intermediate state data 103*a*.

If the steady state data 102*a* is generated in preceding processes (processes performed in steps S1104 and S1105), the intermediate state generating unit 212 uses the steady state data 102*a* generated earlier to start generating the intermediate state data 103*a* (step S1111).

The intermediate state generating unit 212 searches through the input data (non-steady state data) not falling under the steady state data 102*a*, and isolates data in an interval continuous in a time direction (with respect to time) to obtain the intermediate state data for each transitional interval (step S1112).

In FIG. 10, the interval from t1 to t3 represents the input data not falling under the steady state. The data can be obtained by extracting, from among the input data items, samples that do not fall under the steady state data, because samples falling under the steady state data can be identified as described above. The interval from t0 to t1 falls under (6) of the steady state data 1301 shown in FIG. 11A and the interval from t3 to t4 falls under (3) of the steady state data 1301. The intermediate state generating unit 212 here picks out the input data items at t1 and t3 that represent the steady state data before and after the non-steady state data (step S1113). With the input data items at t1 and t3 set as end points, the intermediate state generating unit 212 sequentially finds intermediate points for approximating the input data items in the transitional interval from t1 to t3 with a straight line such that the input data falls within the given error (step S1114). The error may be given such that, for example, 1% of a maximum value of each sensor data item is set as the error.

The following method may be employed for an algorithm for finding the intermediate point. A straight line having a point 801 and a point 803 as end points is generated. An error between this straight line and the input data (input data for the interval from t1 to t3) is calculated and a point having the largest error is recorded as an intermediate point (a point 809 in this example). With the generated intermediate point and the original end point (the points 801 and 803 in this example) defined as new end points, the same calculation is repeatedly performed to find an intermediate point (a point 808 in this example). The procedure is completed when it is confirmed that all input data items are approximated to have the given error or less. If the input data is formed of information from plurality of sensors, the intermediate point should be found so that each of all parameters has the given error or less.

The intermediate state generating unit 212 outputs data including the intermediate point information generated as described above as the intermediate state data 103a, and stores the data in the transient state database database 103 (step S1115). In the example shown in FIG. 10, the intermediate state data composed of intermediate point information based on the intermediate points 808, 809 is obtained as the intermediate state data 103a in the interval from t1 to t3, and the intermediate state data composed of intermediate point information based on the intermediate points 810, 811 is obtained as the intermediate state data 103a in the interval from t4 to t6. Values of the intermediate state data corresponding to each of the data items are something like those shown as intermediate state data 1302 of FIG. 11B. In FIG. 11B, the intermediate state data is identified by the reference numeral 1302 different from 103a to mean that the intermediate state data is specific, as in FIG. 11A.

As an example, (8) of the left column in the intermediate state data 1302 will be described. (8) is associated with t8 to mean the state at the intermediate point 808. (6, 3) of a column 1313, the second column from the left, is given by associating connection information of the transient state under which the intermediate state (8) falls with t6, t3 (a relationship of t6=t0 holds). In other words, (6, 3) means that the intermediate state (8) lies between the point 801 and the point 803. (6, 3) has a role of index information used for searching through the intermediate state data 103a and extracting the intermediate state data 1302. Data 1311, the third column from the left, represents the connection information of intermediate points. (6, 9) indicates that (8) of the intermediate state data 1302 is an intermediate point connecting (6) of the steady state data 1301 and (9) of the intermediate state data data 1302. Rb, Te, and Tf are sensor data items at the intermediate points 808, 809, representing the engine speed and the exhaust gas temperature (medians). Each of RL(6, 3) and TL(6, 3) represents an error between an approximate point composed of the intermediate state data 1302 and the original data, and is used also as a permissible error during determination made in the transient state by the state diagnostic device 202. Data 1312a and data 1312b represent time to enter the intermediate state (8) from (6) of the steady state data 1301 and to enter the subsequent intermediate state (9) from the intermediate state (8). In FIG. 10, time differences between t1 and t8 and between t8 and t9 are represented. (9) of the left column of the intermediate state data 1302 is represented as an intermediate point connecting (8) of the intermediate state data 1302 and (3) of the steady state data 1301. Data of intermediate states (10) and (11) are likewise.

Diagnostic processes performed in the state diagnostic device 202 will be described below with reference to FIGS. 12, and 13A to 13C.

Figure 13A:
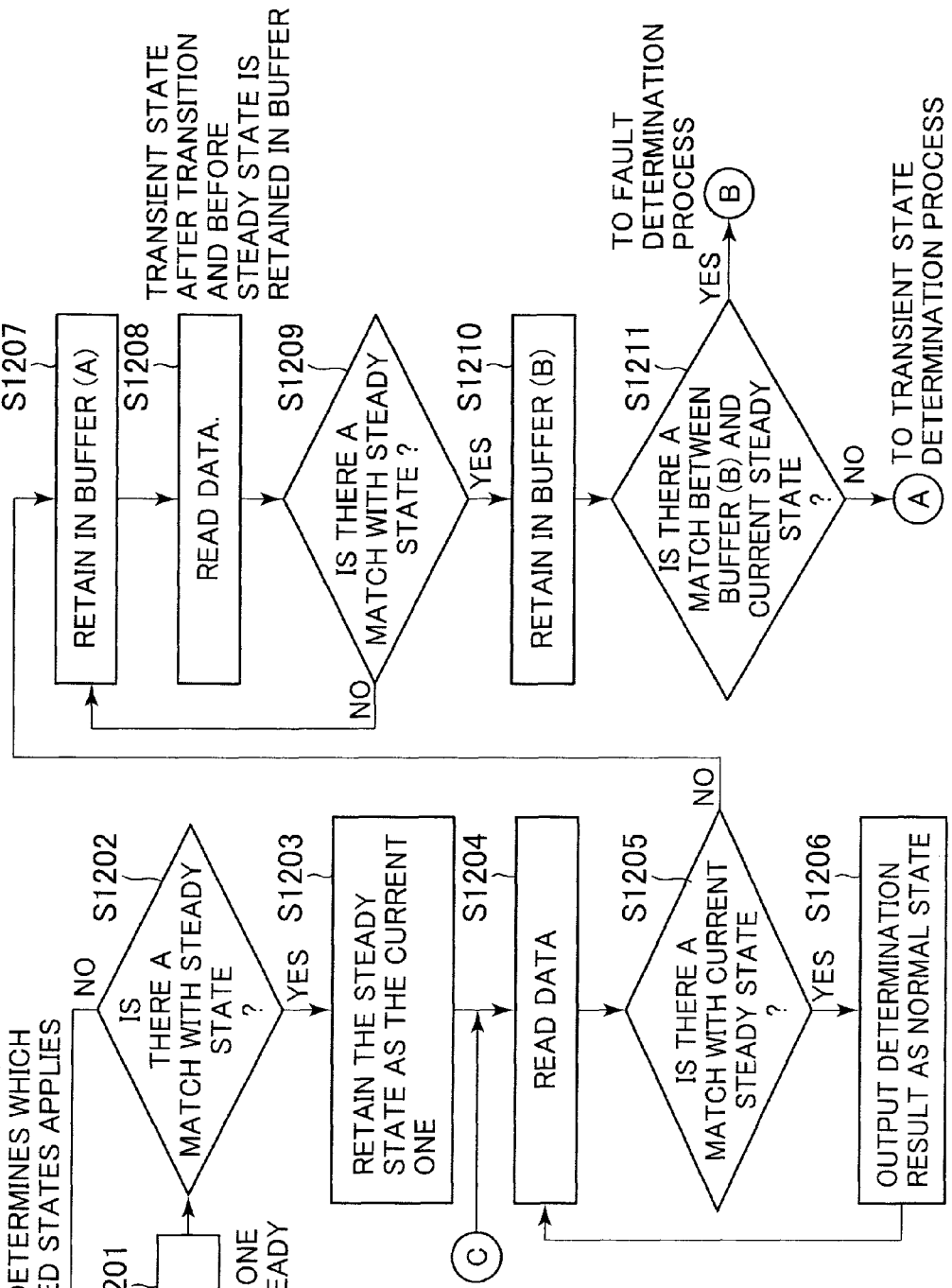
FIG. 13A is a flow chart showing processing functions of the state diagnostic device.
Figure 13B:
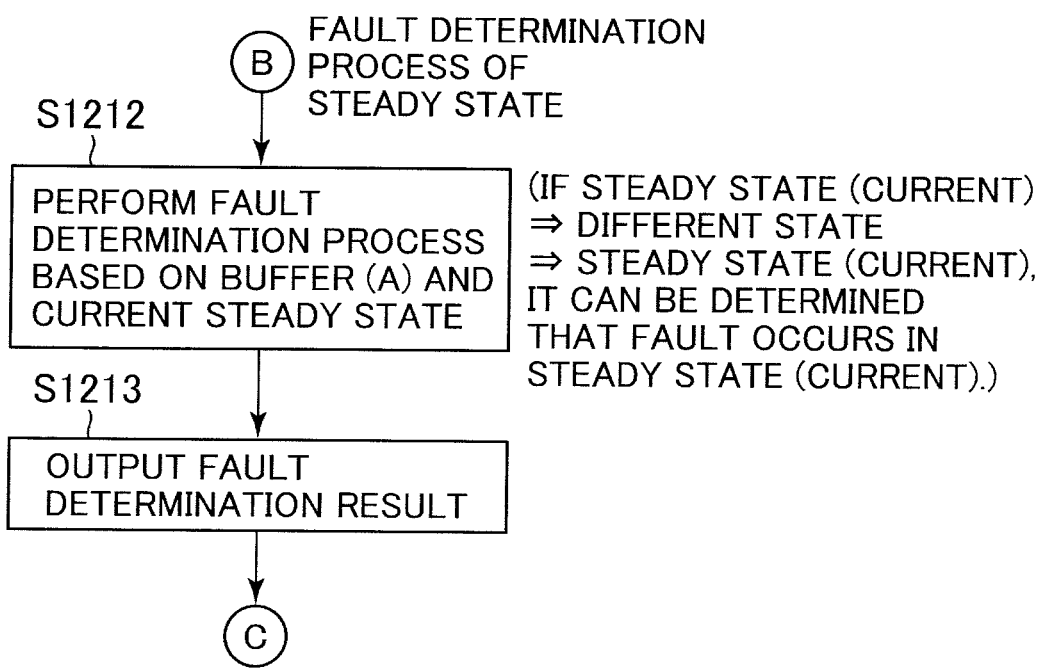
FIG. 13B is a flow chart showing processing functions of the state diagnostic device.

FIG. 12 is a diagram showing a configuration of the state diagnostic device 202. FIGS. 13A to 13c are flow charts showing processing functions of the state diagnostic device 202.

Referring to FIG. 12, the state diagnostic device 202 includes a steady state determining section 111, a supplementary state determining section 112, a supplementary state generating section 113, and an intermediate state retrieving section 114.

The steady state determining section 111, the supplementary state determining section 112, the supplementary state generating section 113, and the intermediate state retrieving section 114 have processing functions as shown in the flow charts of FIGS. 13A to 13C.

Specifically, when the input data 101a is inputted to the steady state determining section 111 (step S1201), the steady state determining section 111 compares the input data 101a with the steady state data 102a to see if there is a match therebetween (step S1202). Details of the steady state data 102a are as described earlier by using as an example the steady state data 1301 with reference to FIG. 11A. At early stages, the input data 101a is read repeatedly until there is a match between the input data 101a and any item of the steady state data 102a. When there is a match between the input data 101a and any item of the steady state data 102a, the input data 101a is retained as "current steady state data" (step S1203). Specifically, index information of the specific data item of the steady state data 102a that matches with the input data 101a is retained in a buffer (not shown). Then, the input data 101a is further read (step S1204) and it is then determined whether the data matches with the "current steady state data" (step S1205). If there is a match, a normal state determination result is outputted as the determination result data 104a and stored in the database 104 (step S1206) and the operation returns to step S1204.

The input data 101a, if it does not match with the "current steady state data", is retained in buffer (A) (not shown) (step S1207) and data is further read (step S1208). Data is repeatedly retained in buffer (A) as long as the data read does not match with any item of the steady state data 102a (step S1209). Data read, if it matches with any item of the steady state data 102a (step S1209), is retained in buffer (B) (step S1210). It is then determined whether the data retained in buffer (B) matches with the "current steady state data" retained in step S1203 (step S1211).

If the data retained in buffer (B) matches with the "current steady state data", it follows that, in the same steady state, data not matching with the "current steady state data" is temporarily inputted, so that it is regarded that a faulty state occurs in the "current steady state data". A fault determination process is then performed (step S1212) and a faulty state determination result is outputted as the determination result data 104a and stored in the database 104 (step S1213). Thereafter, reading of data is continued (step S1204).

If the data retained in buffer (B) does not match with the "current steady state data", it follows that transition occurs between different steady states, so that the operation proceeds to determination in the transient state. The intermediate state retrieving section 114 defines the steady state data retained in buffer (B) as "subsequent steady state data" and, based on the "current steady state data" and the "subsequent steady state data", searches through the intermediate state data 103a (step S1214). The supplementary state generating section 113 generates supplementary data (step S1215) based on the intermediate state data 103a retrieved and the steady states before and after the transition (the "current steady state data" and the "subsequent steady state data"). The supplementary state determining section 112 determines whether the input data 101a retained in buffer (A) matches with the supplementary data (step S1216).

If the input data 101a retained in buffer (A) matches with the supplementary data generated, a normal state determination result is outputted as the determination result data 104a and stored in the database 104 (step S1217). The "subsequent steady state data" is then replaced by the "current steady state data" (step S1220) and reading of data is continued (step S1204). If the input data 101a retained in buffer (A) does not match with the supplementary data generated, a fault determination process is performed based on the input data 101a retained in buffer (A) and the supplementary data generated (step S1218), and a faulty state determination result is outputted as the determination result data 104a and stored in the database 104 (step S1219). The "subsequent steady state data" is then replaced by the "current steady state data" (step S1220) and reading of data is continued (step S1204).

Figure 14:
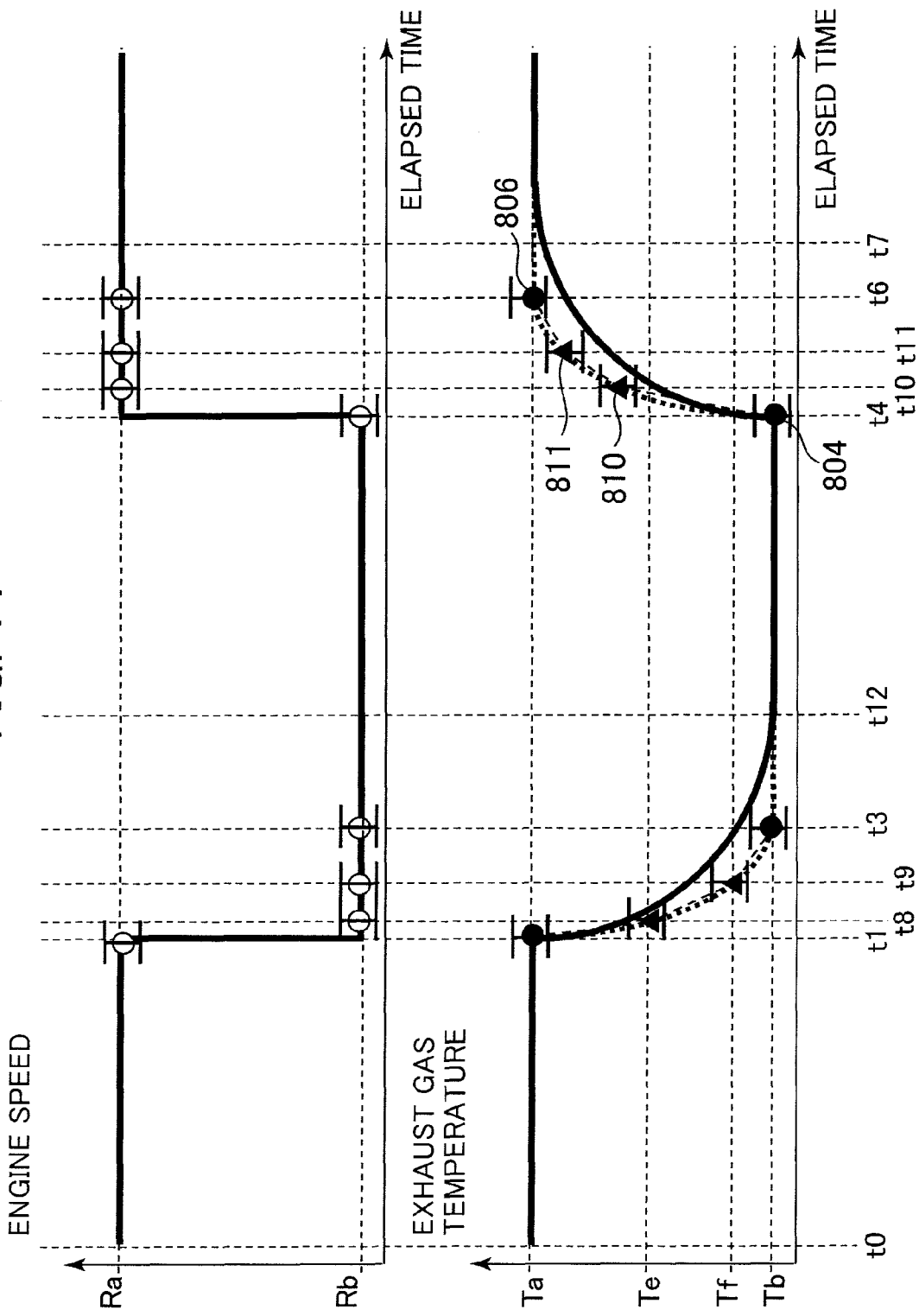
FIG. 14 is a diagram showing a relationship between changes in the engine speed and the exhaust gas temperature and the intermediate state data during diagnosis.

Contents of diagnosis in the state diagnostic device 202 will be described in greater details with reference to the steady state data 1301 and the intermediate state data 1302 of FIGS. 11A and 11B, respectively, and FIG. 14. FIG. 14 is a diagram showing a relationship between changes in the engine speed and the exhaust gas temperature and the intermediate state data during diagnosis, similar to that shown in FIG. 10.

In the interval from t0 to t1 in FIG. 14, the engine speed is Ra and the exhaust gas temperature is Ta and they match with data of the steady state (6) in the steady state data 1301 shown in FIG. 11A, so that operations are performed according to steps from step S1201 to step S1206 and the determination result data 104a is outputted as a normal state.

Next, since there is no match with the steady state data 1301 in the interval from t1 to t12 as shown in FIG. 14, the input data for the interval from t1 to t12 is retained in buffer (A) in step S1207. When time t12 arrives, there is a match with data in the steady state (3) in the steady state data 1301 of FIG. 11A. Since the data is different from that in the steady state (6), the operation proceeds to step S1214. In step S1214, the intermediate state retrieving section 114 searches through the intermediate state data for transition from the steady state (6) to the steady state (3) by using (6, 3) in the column 1313 as an index, and outputs the data in the intermediate states (8) and (9) as a retrieving result.

With the data of (8) and (9) retrieved as the intermediate state data, the supplementary state generating section 113 finds, in step S1215, supplementary data at each of different points in time over a straight line extended to approximate an interval from time t1 to time t8. Specifically, based on the data in the intermediate state (8), the engine speed is Rb and the exhaust gas temperature is Te at time t8 which is obtained by adding a time difference of t(6, 8) to time t1 (the last time at which there is a match with the steady state (6)). In this case, the supplementary data is such that the engine speed remains constant at Rb and the exhaust gas temperature represents values at different points in time on a line segment on which the exhaust gas temperature is Ta at time t1 and Te at time t8.

The supplementary state determining section 112 determines in step S1216 whether the input data falls within an error of RL(6, 3) for the engine speed and an error of TL(6, 3) for the exhaust gas temperature relative to the supplementary data obtained at each point in time. In this embodiment, if there is no deviation from the error range in the interval from time t1 to time t8, it is then determined in step S1216 that there is a match.

The supplementary state generating section 113 then finds supplementary data at each point in time over a straight line extended to approximate an interval from time t8 to time t9. The supplementary state determining section 112 determines in step S1216, as with the interval from time t1 to time t8, whether the input data does not deviate from the error range relative to the supplementary data found at each point in time. If there is deviation, it is determined that there is a mismatch from time t8 to time t9. As a result, in step S1216, an overall decision is made that there is a mismatch between the input data and the generated supplementary state and the operation proceeds to step S1218. In step S1218, a faulty state is determined if the error is not satisfied and, in step S1219, a determination result is outputted that the exhaust gas temperature falls outside the error range and is faulty. In this case, an amount of deviation indicating how much the deviation is relative to the error range may also be outputted. The engine speed does not fall outside the error range and is not determined to be faulty. If there is a match in all supplementary states, the operation proceeds to step S1217 and a normal state determination result is outputted. Finally, the "current steady state data" is changed from (6) to (3) and reading of data is continued.

The following effects can be achieved according to the embodiment having arrangements as described above.

(1) Performing a diagnosis using the steady state data 102a (steady state information) and the intermediate state data 103a (transient state information) generated by the state learning device 201, each containing a corresponding permissible error, the state diagnostic device 202 can perform a fault diagnosis of the working machine universally for a variety of types of sensor information.

(2) The state learning device 201 clusters the sensor data 101a (running data) into that when the working machine is in the steady operating state and that when the working machine is in the transient operating state to thereby generate the steady state data 102a and the intermediate state data 103a. The state diagnostic device 202 makes a fault determination by identifying the steady operating state and the transient operating state. Therefore, the state diagnostic device 202 is capable of performing a fault diagnosis in the transient operating state which represents a transitional state between operating states as well as in the steady operating state, thereby preventing the working machine from failing.

(3) As a result of (1) and (2) above, learning can be performed universally for many varied operating states of the machine and an appropriate diagnosis can be made even in the transient operating state.

(4) The state diagnostic device 202 makes a fault determination based on the intermediate state data 103a (transient state information) corresponding to the sensor data 101a (running data) in the transient operating state at a specific point in time, which permits appropriate diagnosis even in the transient operating state.

(5) The state diagnostic device 202 makes the fault determination by generating the supplementary data using the intermediate point information and the intermediate state data 103a (transient state information) that includes the permissible error. This minimizes a volume of the intermediate state data 103a to be learned. At the same time, a highly accurate diagnosis can be made using a small amount of the intermediate state data 103a. In addition, learning and diagnosis can be made without requiring advance knowledge of the transient state.

(6) The state diagnostic device 202 performs a diagnosis by inputting a combination of plurality of correlated sensor data 101a (running data) items (for example, the engine speed and the exhaust gas temperature). A fault determination can therefore be made. In addition, a symptom of a fault can be predicted from a change in a relationship of running data and a cause of a fault can be estimated.

The embodiment has been described for the case in which the present invention is applied to the ultra-large scale hydraulic excavator (backhoe type). The present invention may nonetheless be applied to any other type of working machine, as long as the working machine includes a machine body on which a working implement is attached. For example, a load type hydraulic excavator, a hydraulic excavator (e.g., an ordinary large-scale hydraulic excavator or a medium scale hydraulic excavator) smaller in size than the ultra-large one, or even a wheel loader, a crane, a bulldozer, or any type of working machine other than the hydraulic excavator may achieve the same effects through the application of the present invention in the same manner.

In addition, the embodiment has been described for the case in which the plural correlated running data items includes the engine speed and the exhaust gas temperature. Types of the running data items to be combined together may be otherwise (for example, a combination of an engine temperature and a radiator temperature, and a combination of a lever operation amount of an operating lever device and a delivery pressure of a hydraulic pump).

DESCRIPTION OF THE REFERENCE NUMERALS

1: Hydraulic excavator
2: Track structure
3: Swing structure
4: Cab
5: Front working implement
6: Boom
7: Arm
8: Bucket
9: Data recording unit
11: Personal computer
11A: Personal computer main unit
11B: Display
11C: Mouse
11D: Keyboard
12: Server
13: Wireless device
14: Communications satellite
15: Base station
16: Internet
21: Engine controller
22: Vehicle body controller
23: Monitor controller
24: Hydraulic system measuring unit
25: Engine measuring unit
27A: First common communication line
27B: Second common communication line
28: Electronic governor
29A, 29B: Electric lever device
31: Display
32: Operating section
100: Learning diagnostic system
101: Input database
101a: Sensor data (running data)
102: Steady state database
102a: Steady state data (steady state information)
103: Transient state database
103a: Intermediate state data (transient state information)
104: Determination result database
104a: Determination result data
201: State learning device
202: State diagnostic device
203: Display
211: Steady state detecting unit
212: Intermediate state generating unit
111: Steady state determining section
112: Supplementary state determining section
113: Supplementary state generating section
114: Intermediate state retrieving section
801, 803, 804, 806: End point
808, 809, 810, 811: Intermediate point
1301: Steady state data
Ra, Rb: Median (engine speed)
RL3, RL6: Permissible error (engine speed)
Ta, Tb: Median (exhaust gas temperature)
TL3, TL6: Permissible error (exhaust gas temperature)
1302: Intermediate state data
Ra, Rb: Intermediate point information (engine speed)
Te, Tf, Tg, Th: Intermediate point information (exhaust gas temperature)
RL(6, 3), RL(3, 6): Permissible error (engine speed)
TL(6, 3), TL(3, 6): Permissible error (exhaust gas temperature)

The invention claimed is:

1. A learning diagnostic system for a working machine that includes a machine body mounted with a working implement, the learning diagnostic system detecting a state quantity of the working machine with a sensor and inputting the data as running data to thereby detect a fault in an operating state of the working machine using the running data, the system comprising:

a state learning device for sorting the inputted running data inputted continuously at predetermined time intervals from the sensor into first running data when the operating state of the working machine is a steady operating state and second running data when the operating state of the working machine is an intermediate operating state, learning the operating state of the working machine based on the sorted first and second running data, and generating diagnostic steady state information and diagnostic intermediate state information, each including a median and a permissible error; and a state diagnostic device for determining, using the inputted running data and the diagnostic steady state information including the median and permissible error and generated in the state learning device, whether the operating state of the working machine related to the inputted running data is the steady operating state or the intermediate operating state, while making a fault determination in the determined steady operating state, and using the diagnostic intermediate state information including the median and permissible error and generated in the state learning device to make a fault determination in the determined intermediate operating state, wherein: the state learning device selects, of the second running data when the operating state is the intermediate operating state, running data in an interval continuous with respect to time; selects, of the first running data when the operating state is the steady operating state, running data in two steady operating states before and after transition to the intermediate operating state in which the running data is selected; and generates the intermediate state information based on the running data selected in the two steady operating states and the running data selected in the intermediate operating state; and the state diagnostic device searches through the diagnostic intermediate state information generated in the state learning device based on the two steady operating states before and after the transition to the determined intermediate operating state to thereby extract corresponding diagnostic intermediate state information, and makes a fault determination in the determined intermediate operating state based on the determined intermediate operating state and the extracted diagnostic intermediate state information; and wherein the state learning device generates the diagnostic intermediate state information based on the running data selected in the two steady operating states and the running data selected in the intermediate operating state by calculating intermediate point information that approximates the running data selected in the intermediate operating state with plurality of straight lines, using the calculated intermediate point information as said median and generating the diagnostic intermediate state information including the median and the permissible error; and the state diagnostic device generates, in the determined intermediate operating state, supplementary data based on the intermediate point information generated in the state learning device, and makes a fault determination using the supplementary data and the median and permissible error.

2. The learning diagnostic system for the working machine according to claim 1, wherein: the state learning device comprises:

means for generating the steady state information based on the running data when the operating state of the working machine is the steady operating state by sorting the inputted running data into running data when the operating state of the working machine is the steady operating state and running data at other time; and means for generating the intermediate state information based on the running data at other time as sorted in the steady state information generating means, the running data being used as running data when the working machine is in the intermediate operating state.

3. The learning diagnostic system for the working machine according to claim 1, wherein: the state diagnostic device comprises:

steady state determining means for determining whether the operating state of the working machine related to the inputted running data is the steady operating state or the intermediate operating state by using the steady state information generated in the state learning device, and making a fault determination in the determined steady operating state;

intermediate state information retrieving means for searching through the intermediate state information generated in the state learning device by using the running data in the steady operating state determined in the steady state determining means, and extracting corresponding intermediate state information;

supplementary state generating means for generating supplementary data based on the intermediate state information extracted in the intermediate state retrieving means; and supplementary state determining means for making a fault determination based on the running data in the intermediate operating state determined in the steady state determining means and the supplementary data generated in the supplementary state generating means.

4. The learning diagnostic system for the working machine according to claims 1, wherein: the state learning device inputs, as the running data, a combination of plural correlated running data items and generates the steady state information and the intermediate state information using the plural correlated running data items; and the state diagnostic device inputs, as the running data, the same combination of the plural correlated running data items as that inputted by the state learning device, and makes a fault determination of the plural correlated running data items.

5. A state learning device for a working machine, which is used in a learning diagnostic system, the working machine including a machine body mounted with a working implement, the learning diagnostic system detecting a state quantity of the working machine with a sensor and inputting the data as running data to thereby detect a fault in an operating state of the working machine using the running data, the state learning device comprising:

means for sorting the running data inputted continuously at predetermined time intervals from the sensor into first running data when the operating state of the working machine is the steady operating state and second running data at other time, and generating diagnostic steady state information including a median and a permissible error based on the first running data when the operating state of the working machine is a steady operating state; and means for using the second running data at other time as sorted in the steady state information generating means as running data when the working machine is in the intermediate operating state and generating the diagnostic intermediate state information including a median and a permissible error based on the second running data at other time as sorted in the steady state information generating means, wherein: the intermediate state information generating means selects, of the second running data when the operating state is the intermediate operating state, running data in an interval continuous with respect to time; selects, of the first running data when the operating state is the steady operating state, running data in two steady operating states before and after transition to the intermediate operating state in which the running data is selected; and generates the diagnostic intermediate state information based on the running data selected in the intermediate operating state and the running data selected in the two steady operating states by calculating intermediate point information that approximates the running data selected in the intermediate operating state with plurality of straight lines, using the calculated intermediate point information as said median and generating the diagnostic intermediate state information including the median and the permissible error.

6. The state learning device for the working machine according to claim 5,
wherein: the steady state information generating means inputs, as the running data, a combination of plural correlated running data items, and generates the steady state information using the plural correlated running data items; and
the intermediate state information generating means generates the intermediate state information using the plural correlated running data items.

7. A state diagnostic device for a working machine, which is used in a learning diagnostic system, the working machine including a machine body mounted with a working implement, the learning diagnostic system detecting a state quantity of the working machine with a sensor and inputting the data continuously at predetermined time intervals as running data to thereby detect a fault in an operating state of the working machine using the running data and diagnostic steady state information and diagnostic intermediate state information, each including a median and a permissible error generated in a state learning device, the state diagnostic device comprising:
steady state determining means for determining whether the operating state of the working machine related to the inputted running data is a steady operating state or a intermediate operating state by using the diagnostic steady state information generated in the state learning device, and making a fault determination in the determined steady operating state;
intermediate state information retrieving means for searching through the diagnostic intermediate state information generated in the state learning device by using the running data in the steady operating state determined in the steady state determining means, and extracting corresponding diagnostic intermediate state information;
supplementary state generating means for generating supplementary data based on the intermediate state information extracted in the diagnostic intermediate state information retrieving means; and
supplementary state determining means for making a fault determination based on the running data in the intermediate operating state determined in the steady state determining means and the supplementary data generated in the supplementary state generating means.

8. The state diagnostic device for the working machine according to claim 7,
wherein: the state learning device selects, of the running data when the operating state is the intermediate operating state, running data in an interval continuous with respect to time; selects, of the running data when the operating state is the steady operating state, running data in two steady operating states before and after transition to the intermediate operating state in which the running data is selected; and generates the intermediate state information based on the running data selected in the two steady operating states and the running data selected in the intermediate operating state; and
the intermediate state information retrieving means searches through the intermediate state information generated in the state learning device based on the two steady operating states before and after the transition to the determined intermediate operating state to thereby extract corresponding intermediate state information.

9. The state diagnostic device for the working machine according to claim 7,
wherein: the state learning device selects, of the running data when the operating state is the intermediate operating state, running data in an interval continuous with respect to time; selects, of the running data when the operating state is the steady operating state, running data in two steady operating states before and after transition to the intermediate operating state in which the running data is selected; based on the running data selected in the two steady operating states and the running data selected in the intermediate operating state, calculates intermediate point information that approximates the running data selected in the intermediate operating state with plurality of straight lines; and used the calculated intermediate point information as said median and generates the intermediate state information including the median and permissible error;
the supplementary state generating means generates the supplementary data based on the intermediate point information generated in the state learning device; and
the supplementary state determining means makes a fault determination using the supplementary data and the median and permissible error.

10. The state diagnostic device for the working machine according to any one of claims 7 to 9,
wherein: the state learning device inputs, as the running data, a combination of plural correlated running data items, and generates the steady state information and the intermediate state information using the plural correlated running data items;
the steady state determining means inputs, as the running data, the same combination of the plural correlated running data items as that inputted by the state learning device, determines whether the operating state of the working machine is the steady operating state or the intermediate operating state based on the plural correlated running data items, and makes a fault determination in the determined steady operating state; and
the intermediate state information retrieving means and the supplementary state determining means retrieve and make a fault determination based on the plural correlated running data items.

* * * * *